(12) United States Patent
Takeshita et al.

(10) Patent No.: US 10,440,090 B2
(45) Date of Patent: Oct. 8, 2019

(54) INFORMATION PROCESSING APPARATUS, INFORMATION PROCESSING SYSTEM, INFORMATION PROCESSING METHOD, AND NON-TRANSITORY COMPUTER READABLE MEDIUM

(71) Applicant: FUJI XEROX CO., LTD., Tokyo (JP)

(72) Inventors: Yoshihiro Takeshita, Kanagawa (JP); Shin Otake, Kanagawa (JP); Tomohisa Ishikawa, Kanagawa (JP); Yang Liu, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 190 days.

(21) Appl. No.: 14/833,771

(22) Filed: Aug. 24, 2015

(65) Prior Publication Data

US 2016/0088057 A1 Mar. 24, 2016

(30) Foreign Application Priority Data

Sep. 24, 2014 (JP) .................................. 2014-193649

(51) Int. Cl.
*H04L 29/08* (2006.01)
*G06F 3/12* (2006.01)
*H04L 29/06* (2006.01)

(52) U.S. Cl.
CPC ............ *H04L 67/02* (2013.01); *G06F 3/1296* (2013.01); *H04L 67/12* (2013.01); *H04L 69/18* (2013.01)

(58) Field of Classification Search
CPC ......... H04L 67/02; H04L 43/16; H04L 67/12; H04L 69/18; G06F 3/1296; G06F 3/1275; G06F 3/1259

(Continued)

(56) References Cited

U.S. PATENT DOCUMENTS 6,667,810 B1 * 12/2003 Jeyachandran ....... G06F 3/1204
358/1.14
8,254,538 B1 * 8/2012 Watts ...................... H04L 51/36
358/1.15

(Continued)

FOREIGN PATENT DOCUMENTS

JP 11-313122 A 11/1999
JP 2011-123801 A 6/2011

(Continued)

OTHER PUBLICATIONS

Communication dated Nov. 13, 2018 by the Japanese Patent Office in counterpart application No. 2014-193649.

(Continued)

*Primary Examiner* — Patrice L Winder
*Assistant Examiner* — Aye M Aung
(74) *Attorney, Agent, or Firm* — Sughrue Mion, PLLC

(57) ABSTRACT

An information processing apparatus includes a processing unit that performs a process, a controller that performs a control operation to cause the processing unit to perform the process requested by a hypertext transfer protocol (HTTP) request from a display apparatus that displays process results of the process, and a notification unit that notifies the display apparatus of the process results through communication different from an HTTP response responsive to the HTTP request having requested the process to be performed.

13 Claims, 17 Drawing Sheets

(58) Field of Classification Search
USPC .............................................. 358/1.13, 1.15
See application file for complete search history.

(56) References Cited

U.S. PATENT DOCUMENTS

| | | | |
|---|---|---|---|
| 2006/0221375 A1* | 10/2006 | Nagarajan | G06F 3/1222 358/1.14 |
| 2009/0327468 A1 | 12/2009 | Hirsch et al. | |
| 2011/0002016 A1* | 1/2011 | Kuno | H04N 1/00795 358/468 |
| 2011/0228309 A1* | 9/2011 | Kikumoto | G06F 3/1207 358/1.14 |
| 2012/0293837 A1* | 11/2012 | Mori | H04N 1/00244 358/1.15 |
| 2013/0063774 A1* | 3/2013 | Nuggehalli | G06F 3/1207 358/1.15 |
| 2014/0160504 A1* | 6/2014 | Nakashima | H04N 1/00503 358/1.13 |
| 2014/0347688 A1* | 11/2014 | Young | G06F 3/1259 358/1.15 |
| 2015/0009529 A1* | 1/2015 | Osuki | G06F 3/1222 358/1.15 |
| 2016/0011833 A1* | 1/2016 | Takayanagi | G06F 3/1292 358/1.15 |
| 2016/0110320 A1* | 4/2016 | Balinsky | G06F 17/2229 358/1.15 |

FOREIGN PATENT DOCUMENTS

| | | |
|---|---|---|
| JP | 2014-16966 A | 1/2014 |
| JP | 2014-67232 A | 4/2014 |

OTHER PUBLICATIONS

Communication dated May 8, 2018 issued by the Japanese Patent Office in counterpart application No. 2014-193649.
Communication dated Nov. 1, 2017, from State Intellectual Property Office of the P.R.C. in counterpart application No. 201510617394.X.
Communication dated Sep. 21, 2018 from the State Intellectual Property Office of the P.R.C. in counterpart Chinese application No. 201510617394.X.
Communication dated Apr. 13, 2018, from State Intellectual Property Office of the P.R.C. in counterpart application No. 201510617394.X.

* cited by examiner

RUNNING OUT OF TONER, REPLACE TONER CARTRIDGE.

NUMBER OF COPIES: 2 / 3
PAGE NUMBER: 5 / 10

MONOCHROME
A4
100%
SORT

FIG. 16

| PROCESS | AVERAGE PROCESS TIME |
|---|---|
| COPY PROCESS | 2 SECONDS + PAGE COUNT × 2 SECONDS |
| FAX PROCESS OF ORIGINAL DOCUMENT DATA | 3 SECONDS + PAGE COUNT × 0.5 SECONDS |
| READING PROCESS AND FAX PROCESS OF ORIGINAL DOCUMENT DATA | 3 SECONDS + PAGE COUNT × 1.0 SECOND |
| READING PROCESS OF IMAGE FROM SD MEMORY CARD | IMAGE COUNT × 0.05 SECONDS |
| MODIFICATION PROCESS OF PARAMETER | 0.1 SECOND |

INFORMATION PROCESSING APPARATUS, INFORMATION PROCESSING SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-193649 filed Sep. 24, 2014.

BACKGROUND

Technical Field

The present invention relates to an information processing apparatus, an information processing system, an information processing method, and a non-transitory computer readable medium.

SUMMARY

According to an aspect of the invention, there is provided an information processing apparatus. The information processing apparatus includes a processing unit that performs a process, a controller that performs a control operation to cause the processing unit to perform the process requested by a hypertext transfer protocol (HTTP) request from a display apparatus that displays process results of the process, and a notification unit that notifies the display apparatus of the process results through communication different from an HTTP response responsive to the HTTP request having requested the process to be performed.

BRIEF DESCRIPTION OF THE DRAWINGS

Exemplary embodiments of the present invention will be described in detail based on the following figures, wherein:

FIG. 8 illustrates an example of the displayed status information;

FIG. 16 illustrates an example of a process time table;

DETAILED DESCRIPTION

The general configuration, hardware configuration, and functional configuration of an information processing system of an exemplary embodiment are described below with reference to FIG. 1 through FIG. 11.

Figure 1:
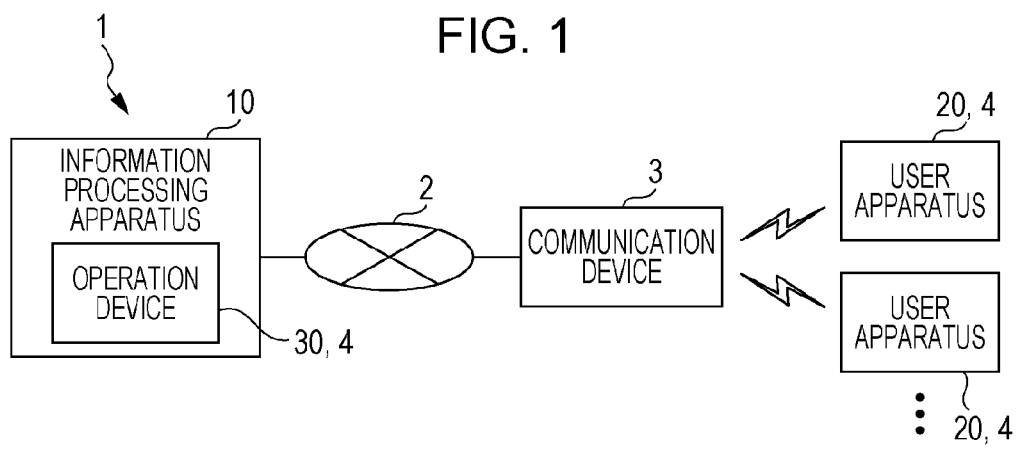
FIG. 1 is a block diagram generally illustrating an information processing system of an exemplary embodiment.

FIG. 1 is a block diagram generally illustrating an information processing system 1 of the exemplary embodiment. Referring to FIG. 1, the information processing system 1 includes a communication network 2, a communication device 3, an information processing apparatus 10, and multiple user apparatuses 20. In the exemplary embodiment, the information processing system 1 provides a user with a copy function, a scan function, a fax (facsimile) function, and a print function (such as outputting image data to a medium).

The communication network 2 includes at least one of the Internet, a mobile communication network, and a telephone network. The communication network 2 interfaces for communications among apparatuses connected thereto. The communication network 2 is connected to the information processing apparatus 10 and the communication device 3. The communication device 3 has the communication function, and performs communications complying with the wireless LAN standards. The communication device 3 communicates with the information processing apparatus 10 via the communication network 2 while wirelessly communicating with the user apparatus 20. In other words, the information processing apparatus 10 communicates with the user apparatus 20 via the communication network 2, and the communication device 3. The information processing apparatus 10 may directly communicate with the operation device 30 without the communication device 3 interconnected therebetween.

The information processing apparatus 10 performs an image processing process to form an image on a medium and an image reading operation to read an image formed on a medium. These processes are performed when the copy function, the scan function, the fax function, or the print function is provided to the user. The information processing apparatus 10 includes the operation device 30 that is used to operate the information processing apparatus 10. The operation device 30 is thus a device to operate the information processing apparatus 10. The operation device 30 is mounted on the housing of the information processing apparatus 10. The operation device 30 is used by a user who approaches the information processing apparatus 10 to use the information processing apparatus 10. The operation device 30 may include a liquid-crystal display, for example, and display image data to operate the information processing apparatus 10 (hereinafter referred to as "operation image data"). The operation image data is described with reference to FIG. 6.

Figure 6:
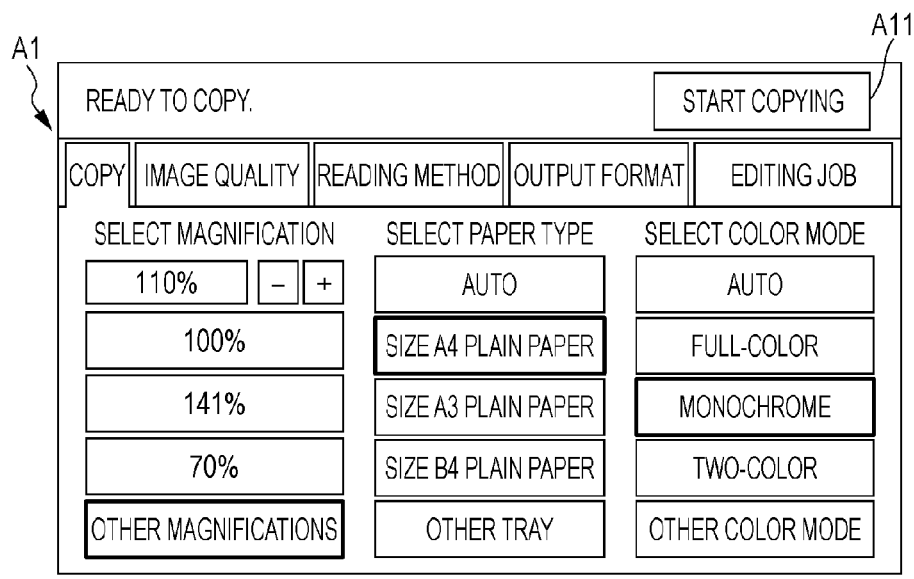
FIG. 6 illustrates an example of displayed operation image data.

FIG. 6 illustrates an example of displayed operation image data. In the example of FIG. 6, an operation image data group A1 to use the copy function is illustrated. The operation image data group A1 includes operation image data A11 to start copying. By tapping the operation image data A11, the user performs an operation corresponding to the operation image data A11, namely, an operation to start copying. When the operation corresponding to the displayed operation image data is performed, the operation device 30 makes a request responsive to the operation the information processing apparatus 10. If an operation is performed on the operation image data A11, the operation device 30 requests the information processing apparatus 10 to perform a process to provide the copy function (more specifically, a series of operations including an image reading operation and an image forming operation, and hereinafter referred to as a "copy process").

The user apparatus 20 displays the operation image data. If an operation is performed on the displayed operation image data, the user apparatus 20 requests the information processing apparatus 10 to perform a process responsive to the operation. In that sense, the user apparatus 20 has a common feature to the operation device 30. The user apparatus 20 may be a tablet terminal or a personal computer. The user apparatus 20 may be carried and used by the user or may be used in an installed state, such as on table top. The user apparatus 20 is not limited to the operation to use the information processing apparatus 10 and may be used for other applications (such as for business use in an office in a company).

The information processing apparatus 10 performs the process in response to the request from the user apparatus 20 or the operation device 30. The information processing apparatus 10 notifies the user apparatus 20 or the operation device 30 of the status of the process by transmitting to the user apparatus 20 or the operation device 30 information indicating the status of the process in progress (hereinafter referred to as "status information").

Figure 7A:
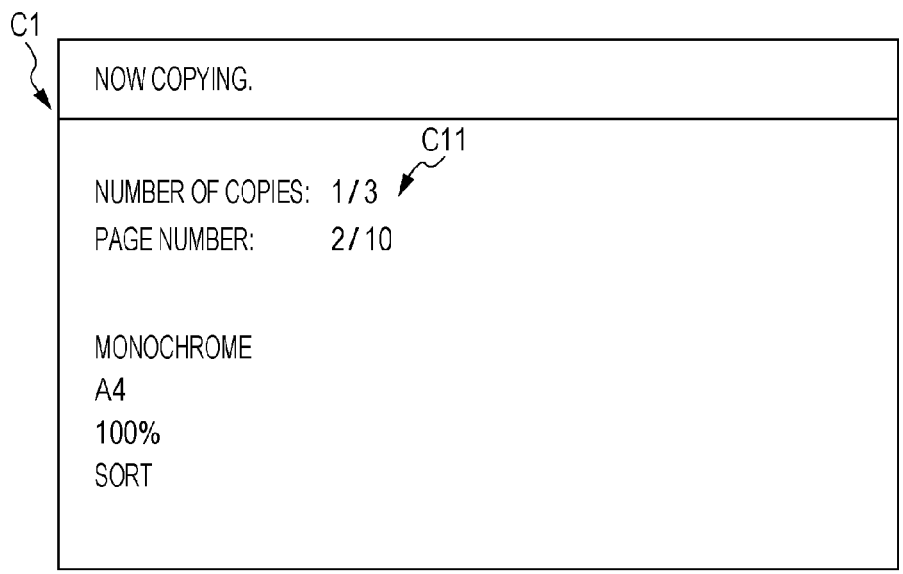
FIG. 7A and FIG. 7B illustrate examples of displayed status information.
Figure 7B:
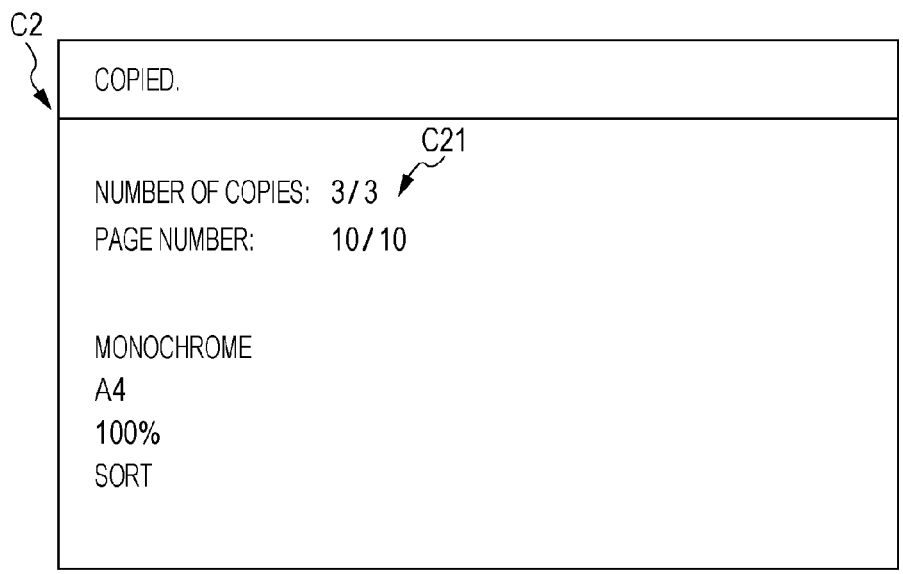

FIG. 7A and FIG. 7B illustrate examples of the displayed status information. If the copy process is complete, the information processing apparatus 10 transmits status information C1 including quantity information C11, such as the number of completed copies (page count and page number), a character string "now copying", and copying parameters such as "monochrome", "A4", "100%", and "sort" as illustrated in FIG. 7A.

When the copy process is in progress and then the requested number of copies has been made, the information processing apparatus 10 transmits status information C2 including quantity information C21 representing the completion of the requested number of copies, and a character string "copied" as illustrated in FIG. 7B. The quantity information C11 and C21 is represented by a fraction with the requested number of copies as a denominator and the completed number of copies as a numerator. The status information includes information indicating the progress of the process, the results of the process, and parameters used in the process. Each of the user apparatus 20 and the operation device 30 displays the notified status as illustrated in FIG. 7A and FIG. 7B. In the discussion that follows, the user apparatus 20 and the operation device 30 may be collectively referred to as a display 4 if there is no need to discriminate one from the other.

Figure 2:
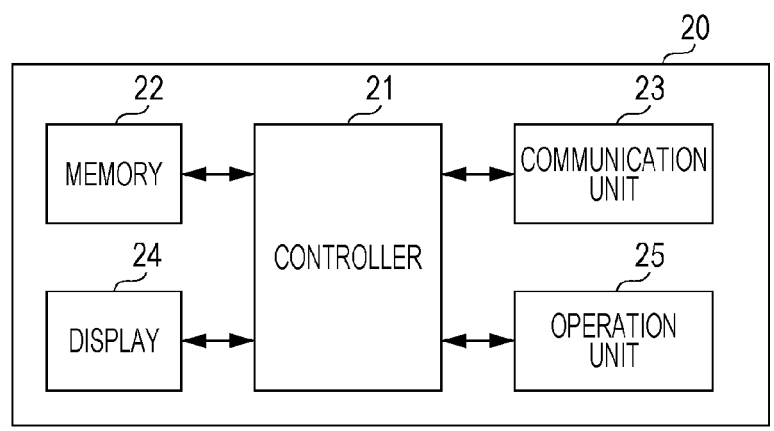
FIG. 2 is a block diagram illustrating an example of the hardware configuration of a user apparatus.

FIG. 2 is a block diagram illustrating an example of the hardware configuration of the user apparatus 20. The user apparatus 20 is a computer that includes a controller 21, a memory 22, a communication unit 23, a display 24, and an operation unit 25. The controller 21 includes a central processing unit (CPU), a read-only memory (ROM), a random-access memory (RAM), and a real-time clock. The CPU uses the RAM as a working area and executes a program stored on the ROM or the memory 22, thereby controlling the operation of each of these elements of the user apparatus 20. The real-time clock calculates the present date and time and notifies the CPU of the present date and time.

The memory 22 includes a hard disk, and stores data, program, and image data, used by the controller 21. The communication unit 23 includes a communication circuit for use in wireless communications complying with wireless local area network (LAN) standards and antenna. For example, the communication unit 23 performs wireless communications with the communication device 3 of FIG. 1. The display 24 includes a liquid-crystal display, and displays an image on the display screen under the control of the controller 21. If the user apparatus 20 is a tablet terminal, the operation unit 25 includes buttons arranged on the housing thereof and a touch sensor (also referred to as a touch screen or a touchpanel) overlaid on the display screen. The operation unit 25 receives a user operation, such as tapping, and transfers to the controller 21 operation data indicating the contents of the operation. If the user apparatus 20 is a personal computer, the operation unit 25 includes a keyboard or a mouse. The controller 21 performs a control operation responsive to the supplied operation data.

Figure 3:
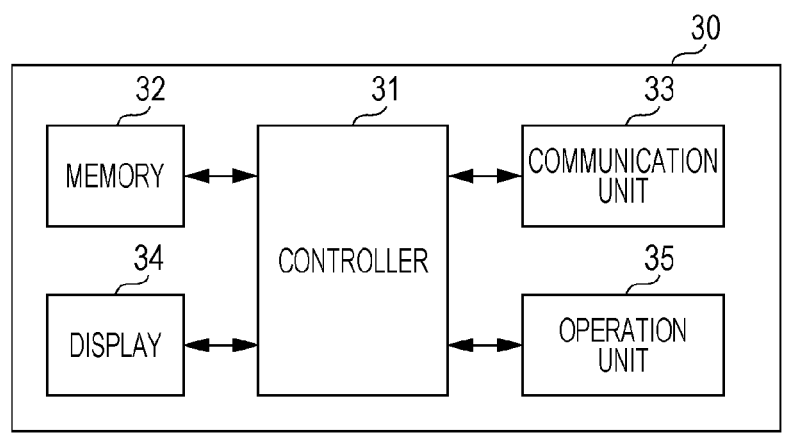
FIG. 3 is a block diagram illustrating an example of the hardware configuration of an operation device.

FIG. 3 is a block diagram illustrating an example of the hardware configuration of the operation device 30. The operation device 30 is a computer that includes a controller 31, a memory 32, a communication unit 33, a display 34, and an operation unit 35. The blocks (other than the communication unit 33) indicating hardware similar to the hardware of each of the blocks in FIG. 2 have the same names and the discussion thereof is omitted. The communication unit 33 includes a communication circuit for communications complying with the wireless LAN standards and a port that receives a connector of a communication cable (more specifically, a LAN cable).

Figure 4:
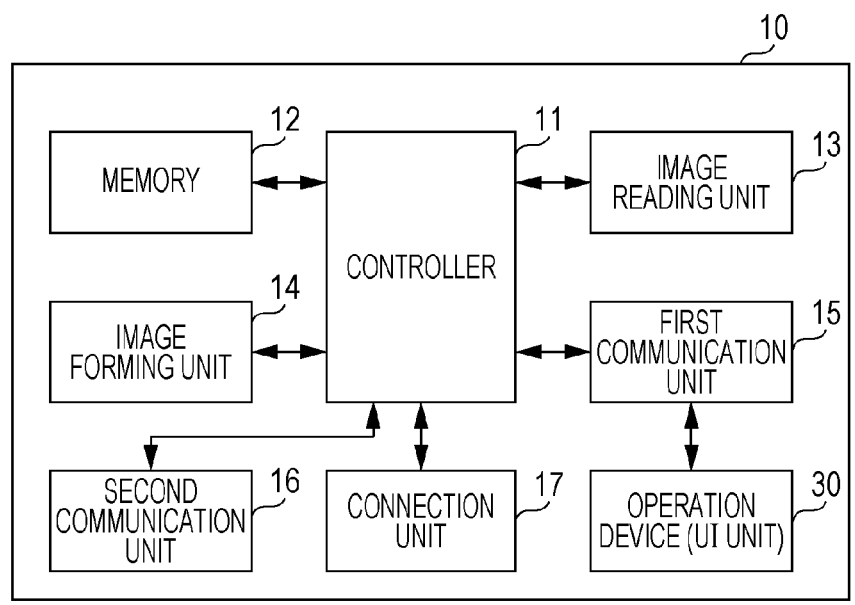
FIG. 4 is a block diagram illustrating an example of the hardware configuration of an information processing apparatus.

FIG. 4 is a block diagram illustrating an example of the hardware configuration of the information processing apparatus 10. The information processing apparatus 10 is a computer that includes a controller 11, a memory 12, an image reading unit 13, an image forming unit 14, a first communication unit 15, a second communication unit 16, and a connection unit 17. The blocks (the controller 11 and the memory 12) indicating hardware similar to the hardware of each of the blocks in FIG. 2 and FIG. 3 have the same names and the discussion thereof is omitted. The information processing apparatus 10 also includes the operation device 30 working as a user interface (UI). The controller 11 controls each element in the information processing apparatus 10 other than the operation device 30 in the exemplary embodiment.

The image reading unit 13 performs an image reading operation to read an image on an original document using a charge-coupled device (CCD) system. The image reading unit 13 optically reads an image formed on a medium, such as a paper sheet, and transfers image data representing the read image to the controller 11. The image forming unit 14 performs an image forming operation to form an image on a medium using an electrophotographic system. The image forming unit 14 forms in a medium, such as a paper sheet, an image indicated by the image data supplied from the controller 11. The systems used to read the image and form the image have been described for exemplary purposes only, and a different system may be used instead.

The first communication unit 15 is connected to the communication unit 33 in the operation device 30 via a communication cable or a data bus and communicates with the operation device 30 without an external device. More specifically, the communication unit 33 communicates with the information processing apparatus 10 without the external device.

The second communication unit 16 includes a communication circuit that, as a communication interface, performs communication complying with the wired LAN standard or wireless LAN standard, a port that receives a connector of a communication cable (LAN cable), and a wireless transmitter and receiver that complies with the wireless LAN standard. The second communication unit 16 performs communication with an apparatus connected thereto via the communication interface. The second communication unit 16 is connected to the communication network 2 of FIG. 1, and communicates with the user apparatus 20 via the external device (which is external to the information processing apparatus 10, and is the communication device 3, for example). The connection unit 17 includes a slot that receives a storage medium, such as a secure digital (SD) memory card, and is thus connected to such a storage medium. The controller 11 reads data from the storage medium or writes data onto the storage medium via the connection unit 17. The operation device 30 is configured as illustrated in FIG. 3, and communicates with the first communication unit 15. By communicating with the first communication unit 15, the operation device 30 works as a user interface (UI) unit. The UI unit displays an image indicated by data transmitted from the controller 11 or transmits to the controller 11 data to operate the information processing apparatus 10.

The controllers of the information processing apparatus 10, the user apparatus 20, and the operation device 30 perform the programs stored on the memories thereof to control the elements thereof. The functions described below are thus implemented.

Figure 5:
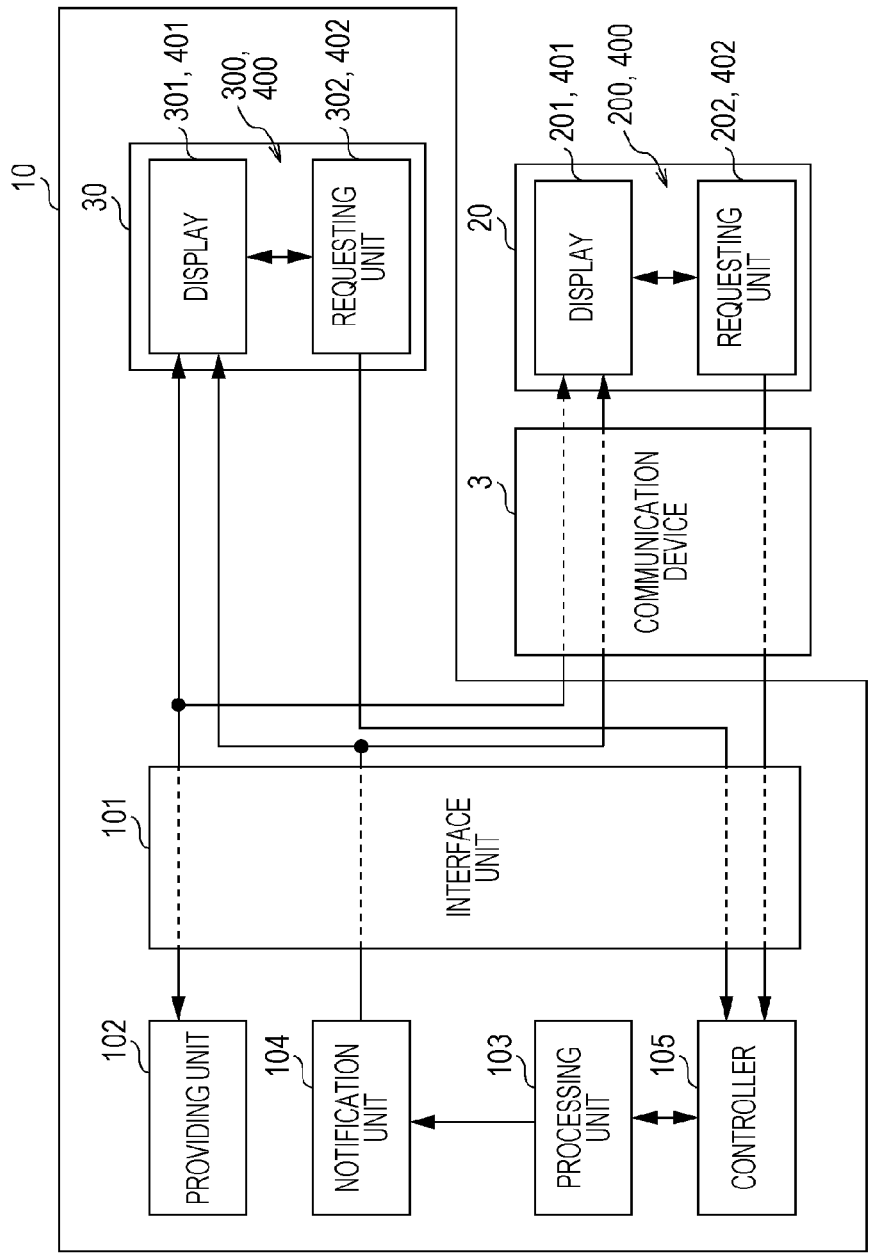
FIG. 5 is a functional block diagram illustrating the information processing system.

FIG. 5 is a functional block diagram illustrating the information processing system 1. The information processing apparatus 10 includes an interface unit 101, a providing unit 102, a processing unit 103, a notification unit 104, and a controller 105. The operation device 30 includes an operation unit 300. The user apparatus 20 includes an operation unit 200.

The interface unit 101 in the information processing apparatus 10 interfaces for communications between the information processing apparatus 10 and the display apparatus 4. More in detail, the interface unit 101 interfaces for communications with a display apparatus (the user apparatus 20 in the exemplary embodiment) connected to the information processing apparatus 10 via the other communication device having a communication function (such as the communication device 3). The interface unit 101 also interfaces for communications with a display apparatus (the operation device 30 in the exemplary embodiment) connected to the information processing apparatus 10 without using the other communication device having a communication function (such as the communication device 3). A communication procedure (or a communication protocol) used by the interface unit 101 is described below.

The interface unit 101 interfaces for communications using a variety of communication protocols. The interface unit 101 performs a control process to interface for communications. For example, the interface unit 101 receives a hypertext transfer protocol (HTTP) request that acquires information serving to organize a user interface and is transmitted from the display apparatus 4, and then transfers the HTTP request to the providing unit 102. The interface unit 101 also transmits to the display apparatus 4, as an HTTP response, information that organizes the user interface described in hypertext markup language (HTML) and is transferred by the providing unit 102 in response.

The interface unit 101 performs a control process to interface for communications. For example, the interface unit 101 receives a process requested transmitted by the display apparatus 4 as an HTTP request, transfers the HTTP request to the controller 105, receives, from the notification unit 104, notification information generated as a result of the process of the processing unit 103 and notification information generated in response to an event having occurred in the information processing apparatus 10, and then transfers the notification information in the form of a HTTP response, for example, to the display apparatus 4. The interface unit 101 may also perform a control process for communications complying with the WebSocket standard. Upon establishing connection with the display apparatus 4 through a transmission control protocol (TCP) handshake, the interface unit 101 not only communicates the XML data indicating the HTTP request and the HTTP response, but also interfaces for transmission of the notification information to the display apparatus 4 at any timing from the notification unit 104. In this way, the information processing system 1 performs not only pull-based communication responsive to the HTTP request transmitted from the display apparatus 4 but also push-based communication transmitted from the information processing apparatus 10.

The interface unit 101 interfaces for communications of the providing unit 102, the notification unit 104, the controller 105, the displays 201 and 301 (referred to as a display 401 if the displays 201 and 301 are not discriminated from each other), the requesting units 202 and 302 (referred to as a requesting unit 402 if the requesting units 202 and 302 are not discriminated from each other). More specifically, the interface unit 101 interfaces for the communication performed between each of the providing unit 102 and the notification unit 104 in the information processing apparatus 10 and the display 401 in the display apparatus 4, and the communication performed between the requesting unit 402 in the display apparatus 4 and the controller 105 in the information processing apparatus 10.

The providing unit 102 in the information processing apparatus 10 provides the above described operation image data to the display apparatus 4 via the interface unit 101. The providing unit 102 stores operation image data as image data to be operated by the user. Upon receiving via the interface unit 101 the HTTP request requesting the operation image data, the providing unit 102 transmits to the requester via the interface unit 101 an HTTP response including the operation image data responsive to the request. The operation image data is information described in the HTML format.

Upon receiving data requesting the operation image data from the user apparatus 20, the providing unit 102 transmits to the user apparatus 20 data in the HTML format as the operation image data in response. Upon receiving data requesting the operation image data from the operation device 30, the providing unit 102 transmits to the operation device 30 data in the HTML format as the operation image data in response. By transmitting the operation image data to the requester of the operation image data (the user apparatus 20 or the operation device 30), the providing unit 102 provides to the requester the data in the HTML format as the operation image data.

The processing unit 103 in the information processing apparatus 10 executes a process. The processing unit 103 performs in addition to the copy process, a scan process, a fax process, and a print process (respectively, processes to perform the scan function, the fax function, and the print function). The copy process includes an image reading operation by the image reading unit 13 and an image forming operation by the image forming unit 14 illustrated in FIG. 4. The scan process includes the image reading operation. The fax process includes a fax communication operation by the second communication unit 16. The print process includes a communication operation by the first communication unit 15 and the image forming operation. Depending on the acquisition and output method of data, the scan process and the fax process may include a data communication operation by the second communication unit 16, a writing operation of writing data onto the memory 12, and a reading operation of reading data from the memory 12. Upon executing the process, the processing unit 103 transfers the status information (information indicating the status of the process being executed) to the notification unit 104.

The notification unit 104 in the information processing apparatus 10 notifies the display apparatus 4 of the status of the process executed by the processing unit 103, via the interface unit 101. In the exemplary embodiment, the notification unit 104 notifies the display apparatus 4 of the status of the process using one of five notification methods of first through fifth notification methods. In the first and second notification methods, the notification unit 104 notifies the display apparatus 4 of the status of the process in response to a request from the display apparatus 4. More specifically, upon receiving the HTTP request from the display apparatus 4 via the interface unit 101, the notification unit 104 describes the status information transferred from the processing unit 103 on the HTTP response responsive to the HTTP request, and then transmits the HTTP response to the display apparatus 4 via the interface unit 101. The notification unit 104 thus notifies the display apparatus 4 of the status of the process.

In the first notification method, if the HTTP request has been received as a request of a process (hereinafter referred to as a "process request") from the display apparatus 4, the notification unit 104 waits on standby until the processing unit 103 has completed the process. The "process" requested here is a process that is to be performed by the processing unit 103. The notification unit 104 describes a status of the completed process, namely, process results on the HTTP response responsive to the HTTP request having requested the process, and then transmits the HTTP response to the display apparatus 4. The notification unit 104 thus notifies the display apparatus 4 of the described process results.

In the second notification method, if the process request via the HTTP request has been received from the display apparatus 4, the notification unit 104 does not wait until the completion of the requested process. The notification unit 104 first notifies the display apparatus 4 of the reception of the process request via the HTTP response responsive to the HTTP request. If the HTTP request describing a request of notification of the status of the process (hereinafter referred to as a "notification request") has been received from the display apparatus 4, the notification unit 104 describes the status information on the HTTP response responsive to the HTTP request and transmits the HTTP response. The notification unit 104 thus notifies the display apparatus 4 of the status of the process. The display apparatus 4 repeatedly transmits the notification request using the HTTP request (polls the notification unit 104), and the notification unit 104 notifies the display apparatus 4 of the status of the process each time the notification request through the polling has been received. In the exemplary embodiment, the display apparatus 4 repeats the polling until the process results have been notified. The process results may include the completion of the process or quitting the process subsequent to the occurrence of a failure in the middle of the process. The notification unit 104 repeatedly notifies the display apparatus 4 of the status of the process until notifying the process results.

In summary, if the first notification method is used, the notification unit 104 notifies the display apparatus 4 of the process results in the HTTP response responsive to the HTTP request having requested the process. If the second notification method is used, the notification unit 104 notifies the display apparatus 4 of the process results and the status of the process other than the process results in communication different from the communication using the HTTP response responsive to the HTTP request having requested the process, namely, in the HTTP response responsive to the HTTP request having requested the notification. If the first or second notification method is used in this way, the notification unit 104 notifies the display apparatus 4 of the response responsive to the request from the display apparatus 4 (the process request or the notification request). The notification unit 104 thus performs a pull-based notification.

The third or fourth notification method is performed when the interface unit 101 performs TCP handshake with the display apparatus 4 connected to the information processing apparatus 10. Upon receiving the status information from the processing unit 103, the notification unit 104 generates notification data described as the status information using a protocol complying with the WebSocket standard. The notification unit 104 notifies the display apparatus 4 of the status of the process by transmitting the notification data to the display apparatus 4 via the interface unit 101.

If the process request by the HTTP request has been received from the display apparatus 4 in the third notification method, the notification unit 104 notifies the display apparatus 4 in the HTTP response responsive to the HTTP request that the process request has been received, without waiting for the completion of the requested process as in the second notification method. From then on, even if the notification request by the HTTP request is not received when the notification unit 104 receives the status information from the processing unit 103, the notification unit 104 transmits to the display apparatus 4 the notification data describing the received status information. The notification unit 104 thus notifies the display apparatus 4 as the requester of the process results and the status of the process.

If the third notification method is used, the notification unit 104 notifies the display apparatus 4 of the process results and the status of the process in the communication (complying with the WebSocket standard in the exemplary embodiment) different from the communication using the HTTP response responsive to the HTTP request having made the process request.

In the fourth notification method, upon receiving the status information from the processing unit 103, the notification unit 104 transmits to the display apparatus 4 the notification data describing the received status information regardless of the presence or absence of the process request by the HTTP request from the display apparatus 4. The notification unit 104 thus notifies the display apparatus 4 as the requester of the status represented by the status information. In the fourth notification method, the notification unit 104 notifies the display apparatus 4 of predetermined statuses including "running out of toner", "running out of paper sheet", or "failure in the image forming unit". The notification unit 104 may notify each display apparatus 4 of the status of a process individually predetermined for the display apparatus 4.

If the third or fourth notification method is used, the notification unit 104 performs an active notification (push-based notification) regardless of the presence or absence (the process request or the notification request) of the request included in the HTTP request from the display apparatus 4.

Each of the first, second, and third notification methods is used to notify the display apparatus 4 of the process results requested by the display apparatus 4. A procedure of determining which one of the three notification methods the notification unit 104 is to use is described below in detail.

The operation unit 200 in the user apparatus 20 and the operation unit 300 in the operation device 30 (also referred to as an operation unit 400 if the operation unit 200 and the operation unit 300 are not discriminated from each other) is used to operate the information processing apparatus 10. The operation unit 400 is implemented by the display apparatus 4 when the display apparatus 4 executes a browser program, for example. The operation unit 200 includes a display 201 and a requesting unit 202. The operation unit 300 includes a display 301 and a requesting unit 302. If the user apparatus 20 and the operation device 30 are not discriminated from each other, the display and the requesting unit thereof are respectively referred to as a display 401 and a requesting unit 402.

The display 401 (the display 201 in the user apparatus 20 or the display 301 in the operation device 30) displays information and image transmitted from the information processing apparatus 10. For example, the display 401 displays the status information (information representing the results of the process and the status of the process) described on the XML data transmitted from the notification unit 104 in the information processing apparatus 10. For example, the display 401 displays the status information C1 and C2 described with reference to FIG. 7A and FIG. 7B. Other examples of the status information are described with reference to FIG. 8, FIG. 9A and FIG. 9B.

FIG. 8 illustrates an example of the display status information. In this example, the status information indicates an out-of-toner status. More specifically, status information C3 including a character string reading "running out of toner, replace toner cartridge" is displayed.

Figure 9A:
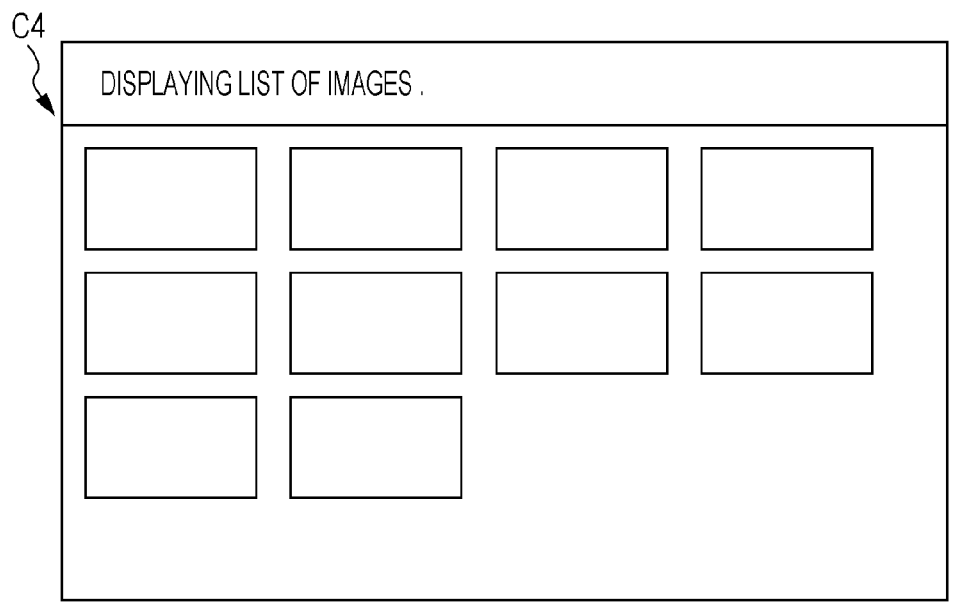
FIG. 9A and FIG. 9B illustrate other examples of the displayed status information.
Figure 9B:
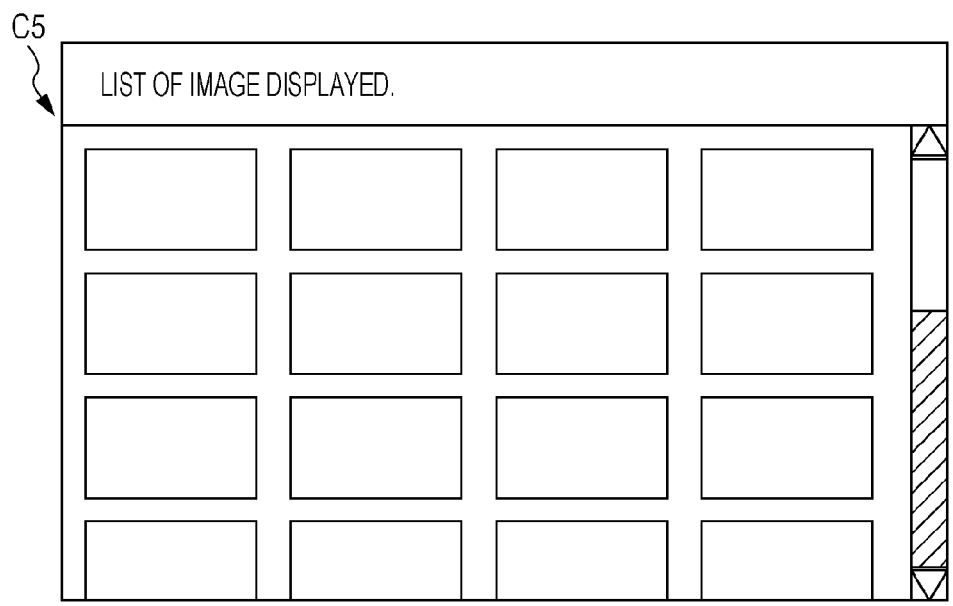

FIG. 9A and FIG. 9B illustrate other examples of the display status information. In the examples, a storage medium, such as a SD memory card, storing multiple images is connected to the connection unit 17 in the information processing apparatus 10 of FIG. 4, and the status of a process of displaying a list of thumbnail images of the images stored on the storage medium and results of the process are displayed. As illustrated in FIG. 9A, the display 401 displays status information C4 including a character string "displaying list of images", and thumbnail images generated from the read images (ten thumbnail images in this case). As illustrated in FIG. 9B, the display 401 displays status information C5 including a character string reading "list of images displayed" and a list of thumbnail images generated from all the images read from the storage medium.

When the user accesses a uniform resource locator (URL) of the information processing apparatus 10, the display 401 transmits the operation image requesting data to the information processing apparatus 10. The display 401 displays the operation image data transmitted from the providing unit 102 in the information processing apparatus 10 in response. More specifically, the display 401 displays the operation image data based on parameters, such as the location and size of the operation image described in the HTML format included in the operation image data. The operation image data thus displayed is the operation image data group A1 of FIG. 6, for example.

The operation image data group A1 includes the operation image data selecting the magnification of the image to be copied, a paper sheet on which to form the copied image, and a color mode of the image to be copied. When the user operates the operation image data, the display 401 applies the contents of the selected parameter to an image in a display format for the user and then displays the image. The example of FIG. 6 includes an image of a character string indicating the currently selected magnification of copying ("110%" in this case) and an image where the operation image data representing the currently selected paper sheet and color mode (character strings "other magnifications", "size A4 plain paper", and "monochrome" in this case) is represented in a display format (using heavier outline, in this case, or a highlighted form or a radio button may also be acceptable) different from an unselected image.

The operation image data group A1 includes the operation image data A11 to start copying. When the operation image data A11 is operated, the information processing apparatus 10 is requested to perform a copy process using a parameter selected at this moment. The display 401 transfers to the requesting unit 402 data that specifies a process request of a parameter selected or set by the user on the displayed operation image data.

When the user makes an operation on the operation image data, the requesting unit 402 (the requesting unit 202 in the user apparatus 20 or the requesting unit 302 in the operation device 30) makes to the information processing apparatus 10 a request corresponding to the user operation through the HTTP request. The requesting unit 402 requests the processing unit 103 to perform the process (the process request), and requests the information processing apparatus 10 to notify the status of the process and the results of the process (notification request) in response to the user operation.

When the user taps a touch sensor of the operation unit, the requesting unit 402 determines whether the tapped location is within an operation image region (for example, within a display region of a button image) based on data supplied from the display 401. Upon determining that the tapped location is within the operation image region, the requesting unit 402 receives an operation on the operation image data displayed in the operation image region. When an operation on a request content determination image (such as the operation image data A11 in FIG. 6) is received, the requesting unit 402 requests the information processing apparatus 10 to perform the process indicated by the request content determination image, using a parameter obtained as a result of the user operation and supplied from the display 401. If an operation is performed on the operation image data A11 in the state of FIG. 6, the requesting unit 402 requests the information processing apparatus 10 to perform monochrome copying on an A4 sheet size plain sheet at a magnification of 110%.

More specifically, the requesting unit 402 generates instruction data and then a HTTP request including the instruction data. The instruction data describes an instruction to perform a process corresponding to the operation image data (the copy process in this case) using the parameter obtained as a result of the user operation. The requesting unit 402 requests the information processing apparatus 10 to perform the process described in the instruction data by transmitting the generated HTTP data to the information processing apparatus 10. The instruction data that the requesting unit 402 transmits to request the process is hereinafter referred to as "process request data".

If the copy process is requested, the process request data including the instruction data of the copy process is generated. Depending on the requested process, no instruction data is included in the process request data. For example, if a process to shut down the power of the information processing apparatus 10 is requested, no instruction data is included in the process request data.

When the requesting unit 402 transmits the HTTP request, an HTTP response is returned in response. The requesting unit 402 performs a series of operations to transmit the HTTP request and receive the HTTP response. During the series of operations, no operation from the user is accepted. For example, the operation image data group A1 of FIG. 6 may now be displayed. Even if the user taps the operation image data, the tapped location is not identified. In other words, the requesting unit 402 stays in a state that receives no operation from the user until the HTTP response responsive to the HTTP request transmitted thereby is received. Once the requesting unit 402 receives the HTTP response, the requesting unit 402 is ready to receive an operation from the user again. Optionally, even in such a state, the requesting unit 402 may be set to receive a user's operation instruction to suspend the process.

Upon receiving the process request data from the display apparatus 4 via the interface unit 101, the controller 105 in the information processing apparatus 10 performs control to cause the processing unit 103 to perform the process requested by the process request data. More specifically, if the controller 105 is requested to perform the request through the HTTP request from the display apparatus 4, the controller 105 controls the processing unit 103 to execute the requested process. The process request data as the XML data transmitted as the HTTP request from the display apparatus 4 is supplied to the controller 105 via the interface unit 101.

The controller 105 analyzes the instruction data included in the process request data and controls the processing unit 103 such that the process is performed in accordance with the contents of the instruction as analysis results of the instruction data. More specifically, the controller 105 executes the instructed process (such as the copy process) in accordance with the parameter described in the instruction data. The processing unit 103 thus reads an image from a medium in accordance with an image quality and an image reading method, specified by the operation of the user, and forms the read image in an output format, magnification, paper sheet, and color mode specified by the operation of the user.

The controller 105 issues a transaction identification (ID) as information identifying the process when the process is performed. The controller 105 associates the issued transaction ID with a destination of communication of the display apparatus 4 as the requester, and then stores the issued transaction ID and the destination of communication in an associated state on the memory 12. In order to perform the process, the controller 105 supplies the issued transaction ID to the processing unit 103, and the processing unit 103 supplies the transaction ID together with the status information to the notification unit 104.

The layered structure of the information processing system 1 is described with reference to FIG. 10 and FIG. 11.

Figure 10:
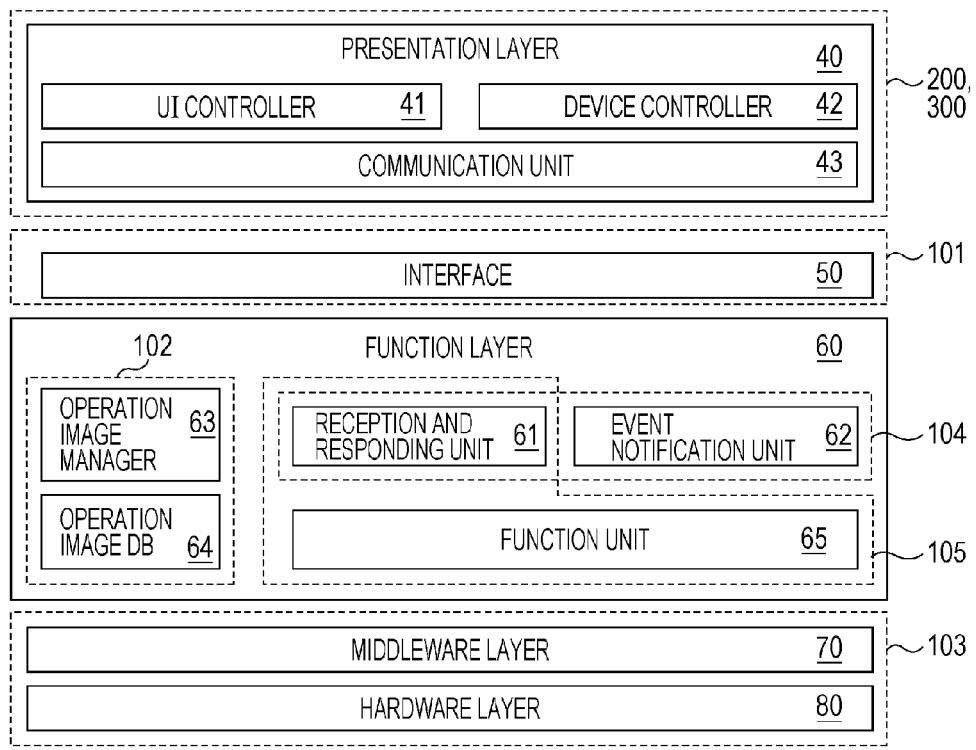
FIG. 10 illustrates an example of a layered structure representing the configuration of the information processing system.

FIG. 10 illustrates an example of the layered structure representing the configuration of the information processing system 1. The information processing system 1 includes a presentation layer 40, an interface 50, a function layer 60, a middleware layer 70, and a hardware layer 80. The presentation layer 40 serves as a layer where a function of receiving an operation from the user (user interface) is performed. The presentation layer 40 thus works as the operation unit 400 of FIG. 5.

The presentation layer 40 includes a user interface (UI) controller 41, a device controller 42, and a communication unit 43. The UI controller 41 controls the user interface, displays the operation image data and the status information, and receives an operation from the user. The UI controller 41 is implemented by the display 401 of FIG. 5. The device controller 42 requests the information processing apparatus 10 to perform the process in response to the operation of the user, and controls the function layer 60 described below. The device controller 42 is implemented by the requesting unit 402. The communication unit 43 controls the communication that the UI controller 41 and the device controller 42 perform with the information processing apparatus 10.

The interface 50 is a layer that performs the function of interfacing for the connection between the presentation layer 40 and the function layer 60. The connection between the presentation layer 40 and the interface 50 may be performed using an external device, such as the communication device 3 having the communication function as illustrated in FIG. 1 (for connection with the user apparatus 20) or may be performed not using such an external device (for connection with the operation device 30). The function layer 60 is used to implement a function of processing data for use in a target application, such as a copy function or a scan function. The middleware layer 70 is used to perform an intermediate and general-purpose process between the function layer 60 and the hardware layer 80. The hardware layer 80 is used to physically implement a process, such as image reading or image forming.

The function layer 60 includes a reception and responding unit 61, an event notification unit 62, an operation image manager 63, an operation image database (DB) 64, and a function unit 65 that provides the copy function and the scan function. The reception and responding unit 61 receives the request of the process indicated by the process request data transmitted from the presentation layer 40 via the interface 50, and requests the function unit 65 to perform the process. The reception and responding unit 61 also issues the transaction ID. The reception and responding unit 61 transmits response data indicating a response to the received request to the presentation layer 40 via the interface 50. The response data may indicate only the reception of the request or may also indicate the status information. More specifically, the reception and responding unit 61 may notify the status of the process, and the notification may be a pull-based notification based on the first or second notification method.

The event notification unit 62 receives the status information via the function unit 65. The event notification unit 62 describes the supplied status information as the notification data, and then transmits the notification data to the presentation layer 40 via the interface 50 using a communication protocol complying with the WebSocket standard. In other words, the notification performed by the event notification unit 62 is a push-based notification based on the third or fourth notification method. The operation image manager 63 manages the operation image data to be transmitted to the presentation layer 40. The operation image DB 64 is a database that stores the operation image data. The function unit 65 is a module group that implements the function that the information processing apparatus 10 provides to the user.

Figure 11:
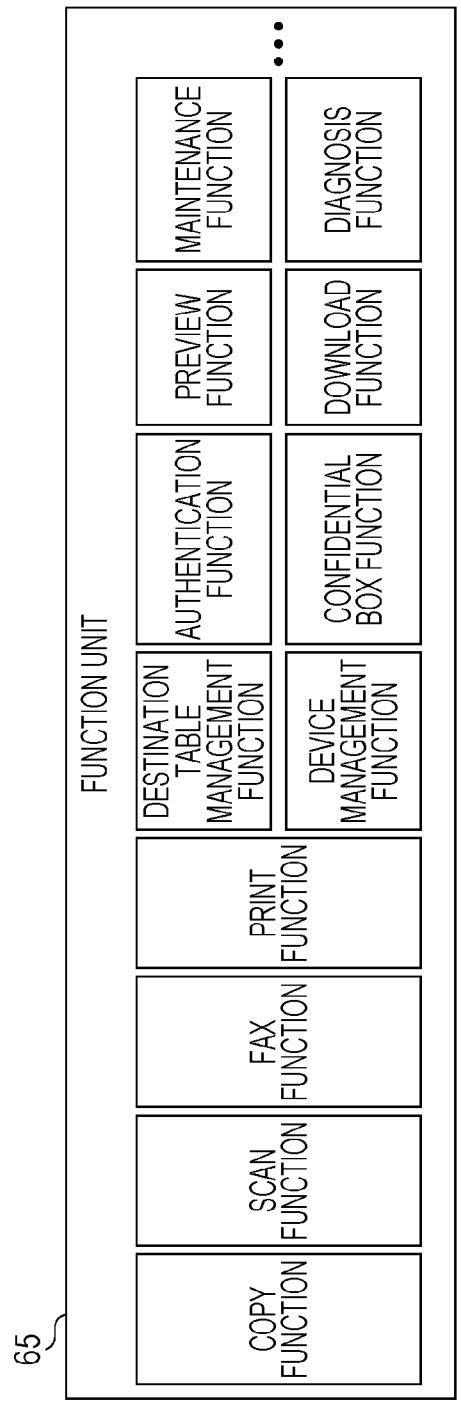
FIG. 11 illustrates an example of a module group included in a function unit.

FIG. 11 illustrates an example of the module group included in the function unit 65. The function unit 65 includes modules that implement a copy function, a scan function, a fax function, a print function, a destination table management function (a function of managing destination information), a device management function (a function of managing the original document setting state of the image reading unit 13, and the state of a medium and consumable supplies on the image forming unit 14), an authenticating function, a confidential box function (a function of managing a digital document stored on the information processing apparatus 10), a preview function, a download function (a function of controlling updating of a program), a maintenance function (a function of maintaining hardware in response to a request from a remote control), and a diagnostic function (a function of diagnosing the hardware).

The interface 50 of FIG. 10 works as the interface unit 101 of FIG. 5. The operation image manager 63 and the operation image DB 64 cooperate with each other, thereby working as the providing unit 102. The middleware layer 70 and the hardware layer 80 cooperate with each other, thereby working as the processing unit 103. The reception and responding unit 61 and the event notification unit 62 cooperate with each other, thereby working as the notification unit 104. The reception and responding unit 61 and the function unit 65 cooperate with each other, thereby working as the controller 105.

The operation of each apparatus when the notification unit 104 in the information processing apparatus 10 performs one of the first through fourth notification methods to notify the status is described with reference to FIG. 12 through FIG. 15. Entities active in the processes of FIG. 12 through FIG. 14 include the device controller 42 in the display apparatus 4, and the reception and responding unit 61 and the event notification unit 62, the middleware layer 70, and the hardware layer 80 in the information processing apparatus 10. In the process of FIG. 15, the same active entities are used except that the reception and responding unit 61 is replaced with the interface 50.

Figure 12:
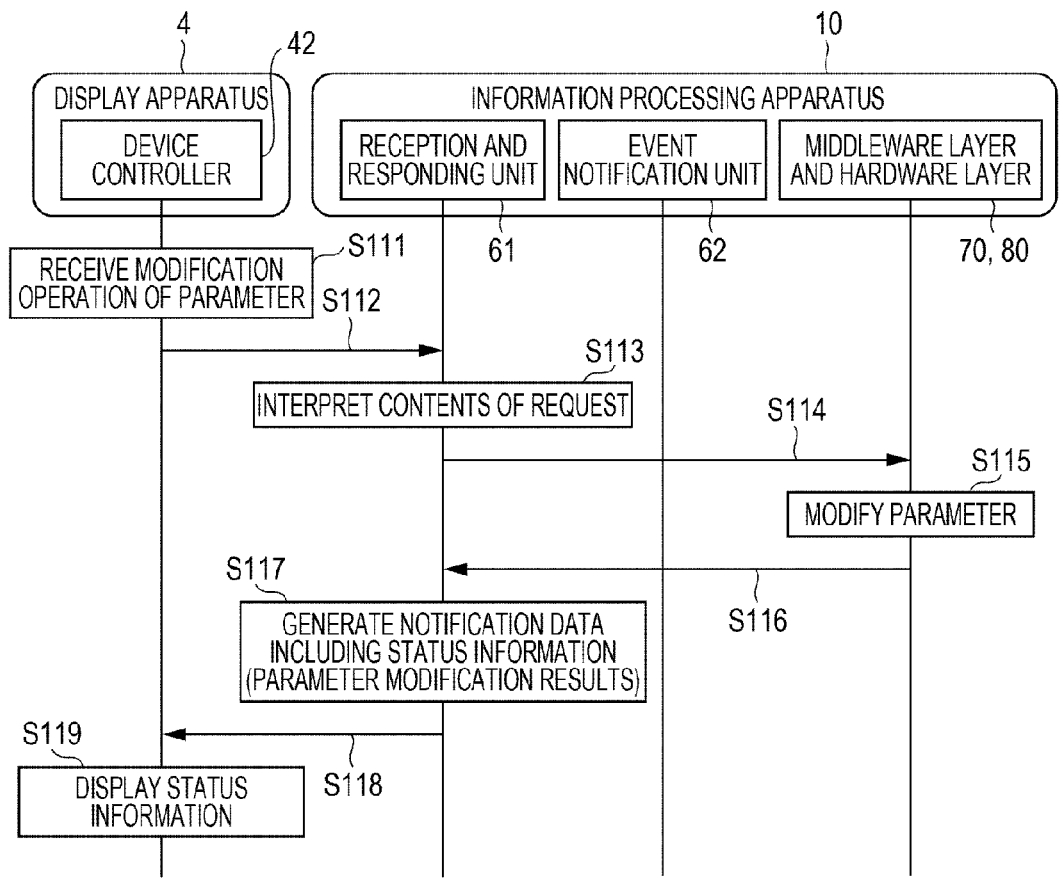
FIG. 12 is a sequence chart illustrating an example of the operation of each apparatus when a first notification method is used.

FIG. 12 is a sequence chart illustrating an example of an operation of each apparatus when the first notification method is used. The process of FIG. 12 is triggered when an operation is made to modify a parameter for copying (such as magnification, size of a paper sheet, or color mode) before the user performs the copying. Upon receiving an operation to modify the parameter (step S111), the device controller 42 in the display apparatus 4 includes in the HTTP request the instruction data describing the request to modify the parameter, and then transmits the HTTP request to the information processing apparatus 10 (step S112). Upon receiving the HTTP request, the reception and responding unit 61 in the information processing apparatus 10 interprets the contents of the request described in the instruction data (step S113), and instructs the middleware layer 70 of the information processing apparatus 10 to execute the process in accordance with the interpreted contents (step S114).

The middleware layer 70 and the hardware layer 80 execute the instructed process in cooperation, namely, modify the parameter (step S115). The middleware layer 70 and the hardware layer 80 supply, as the status information, information representing the results of the process to the reception and responding unit 61 (step S116). The reception and responding unit 61 generates the instruction data describing the supplied status information (the modification results of the parameter) (step S117), and then transmits the HTTP response including the instruction data to the display apparatus 4 as the requester of the process (step S118). The device controller 42 in the display apparatus 4 displays the status information described on the received instruction data on the display unit thereof (step S119).

Figure 13:
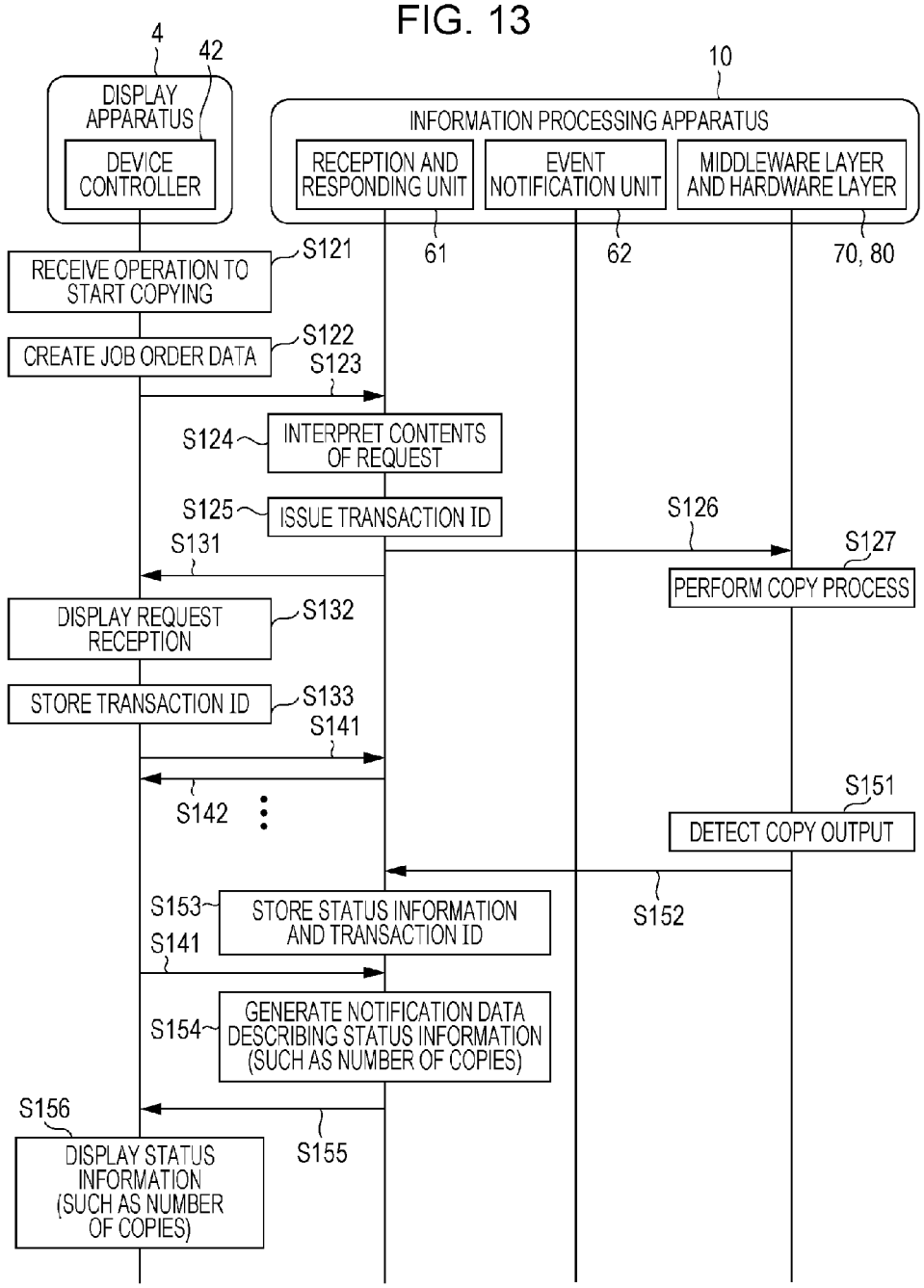
FIG. 13 is a sequence chart illustrating an example of the operation of each apparatus when a second notification method is used.

FIG. 13 is a sequence chart illustrating an example of an operation of each apparatus when the second notification method is used. The process of FIG. 13 is triggered when the user makes an operation to cause the display apparatus 4 to start copying with an original document set on the image reading unit 13 in the information processing apparatus 10. Upon receiving the operation to start copying (step S121), the device controller 42 in the display apparatus 4 generates instruction data responsive to the received operation (step S122). The device controller 42 transmits the process request data including the generated instruction data to the information processing apparatus 10 via the communication unit 43 of FIG. 10 (step S123). The reception and responding unit 61 in the information processing apparatus 10 receives the process request data via the interface 50 of FIG. 10, interprets the contents of the requested process in accordance with the instruction data included in the request (step S124), and issues the transaction ID corresponding to the process (step S125).

The reception and responding unit 61 generates information indicating the instruction of the process based on the interpreted contents of the process (the information is called a copy job herein, and is hereinafter generally referred to as "instruction information") and supplies the instruction information together with the transaction ID to the middleware layer 70 (step S126). The middleware layer 70 and the hardware layer 80 execute the process (copy process) in cooperation based on the instruction information (step S127). After supplying the instruction information, the reception and responding unit 61 transmits instruction data as an HTTP response to the display apparatus 4 (step S131). The HTTP response includes the instruction data that describes the issued transaction ID and information that the request to copy has been received (such as a character string "copy job has been accepted"). The operation in step S131 may be performed in parallel with or prior to the operation in step S126. The device controller 42 in the display apparatus 4 references the HTTP response, and displays on the display unit thereof information indicating that the request has been accepted (step S132), and causes the transaction ID to be stored on the memory thereof (step S133).

After receiving the response to the request of the copy process, the device controller 42 in the display apparatus 4 includes in an HTTP request the process request data describing the notification request requesting the status of the copy process to be notified and the transaction ID stored in step S133, and then transmits the HTTP request (step S141). If the status information of the copy process associated with the transaction ID is not yet supplied, the reception and responding unit 61 in the information processing apparatus 10 transmits to the display apparatus 4 the HTTP response that indicates that the status information has not been received (step S142). The operations in steps S141 and S142 are repeated.

When a copy (an image indicating the read original document) is output to a medium, the middleware layer 70 of the information processing apparatus 10 detects the copy (step S151). The middleware layer 70 associates the status information indicating that the copy has been output to the medium with the transaction ID supplied in step S126, and then supplies the status information with the transaction ID associated therewith to the reception and responding unit 61 (step S152). The reception and responding unit 61 causes the memory 12 to store the supplied status information and transaction ID (step S153). Upon receiving the HTTP request including the process request data having the notification request and transaction ID described thereon after step S153 (step S141), the reception and responding unit 61 reads from the memory 12 the status information associated with the transaction ID described on the process request data included in the HTTP request, and generates an HTTP response including the notification data having the status information described thereon (step S154).

When the reception and responding unit 61 transmits the HTTP response including the notification data to the display apparatus 4 (step S155), the device controller 42 in the display apparatus 4 displays the status information described on the notification data included in the HTTP response as illustrated in step S132 on the display unit of the display apparatus 4 (step S156). Since the information related to the process requested by the display apparatus 4 is associated with the transaction ID, the status of the process is notified to the display apparatus 4 as the requester. The operations in steps S151 through S156 are repeated until the process results are notified at the end of the copy process.

Figure 14:
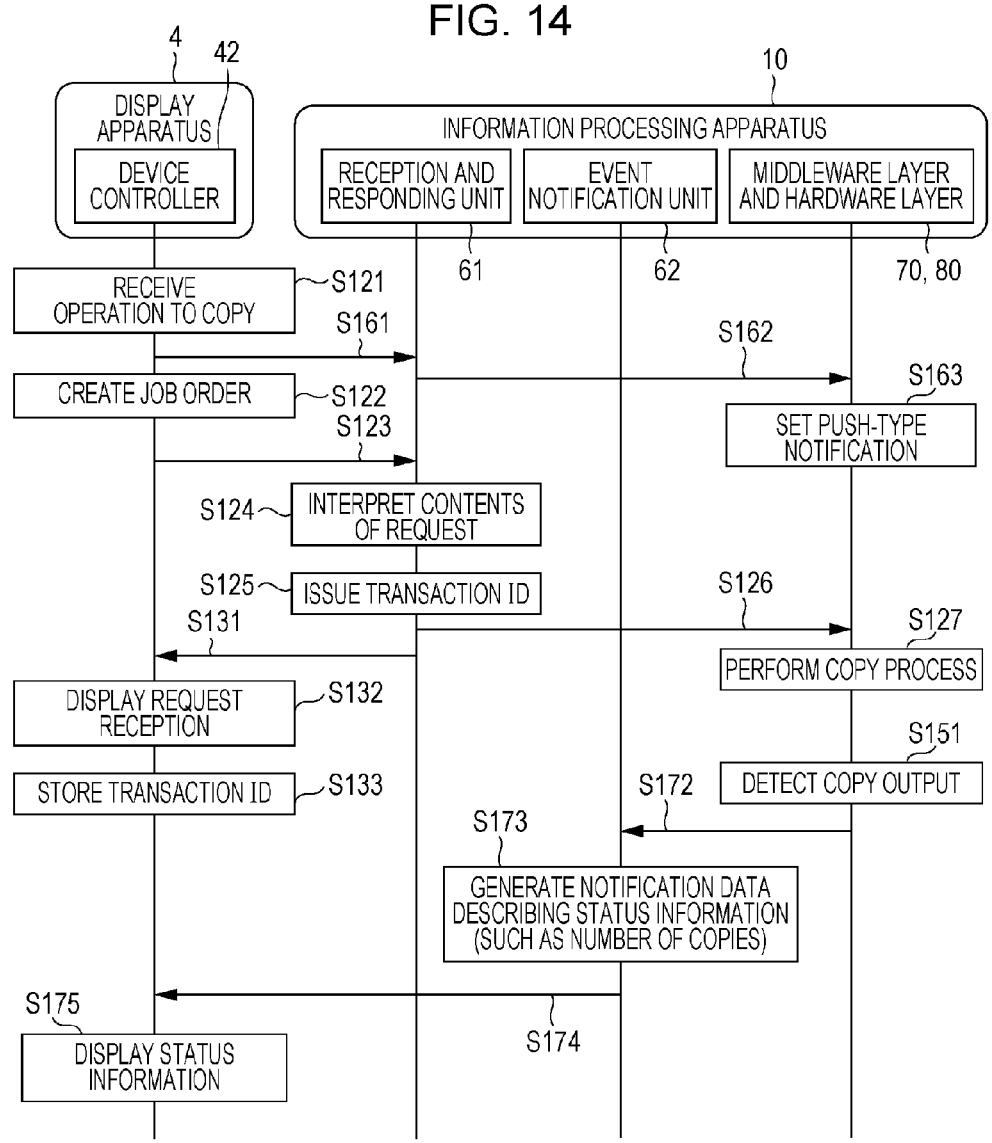
FIG. 14 is a sequence chart illustrating an example of the operation of each apparatus when a third notification method is used.
Figure 15:
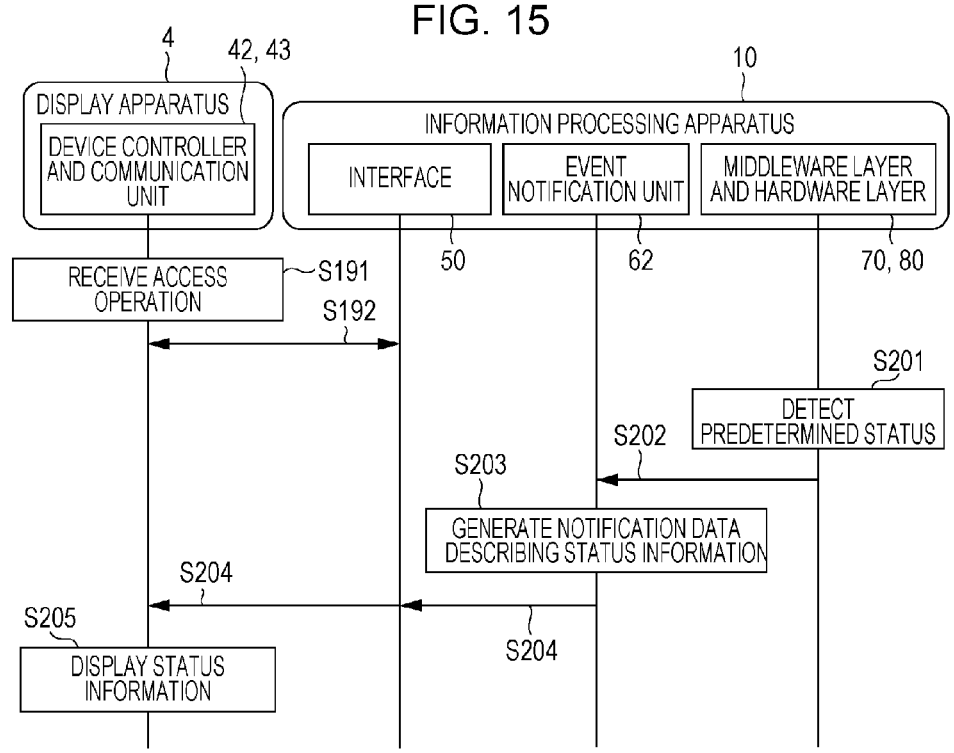
FIG. 15 is a sequence chart illustrating an example of the operation of each apparatus when a fourth notification method is used.

FIG. 14 is a sequence chart illustrating an example of an operation of each apparatus when the third notification method is used. The process of FIG. 14 is triggered when the user performs an operation to start copying as illustrated in FIG. 13. Upon receiving the operation to start copying (step S121), the device controller 42 in the display apparatus 4 transmits to the information processing apparatus 10 the notification request data describing a designation that a push-based notification by the event notification unit 62 is requested (step S161). Upon receiving the notification request data, the reception and responding unit 61 in the information processing apparatus 10 transfers to the middleware layer 70 the contents of the described request (step S162). The middleware layer 70 receives the transferred request, and sets the display apparatus 4 to cause the event notification unit 62 to perform the push-based notification (step S163). The middleware layer 70 turns on a flag indicating whether to perform the notification.

The operations in steps S122 through S127 and the operations in steps S131 through S133 as illustrated in FIG. 13 are then performed. The middleware layer 70 and the hardware layer 80 of the information processing apparatus 10 perform the operation in step S151 (detecting the output copy). Since the flag is turned on, the middleware layer 70 and the hardware layer 80 supply the status information indicating that the copy has been output to the medium and the transaction ID to the event notification unit 62 rather than to the reception and responding unit 61 (step S172). The event notification unit 62 generates the notification data describing the supplied status information (such as the number of copies) and the transaction ID (step S173), and then transmits the notification data to the display apparatus 4 (step S174). The device controller 42 in the display apparatus 4 displays the contents described on the notification data (such as the status information C1 of FIG. 7A) on the display unit of the display apparatus 4 (step S175). The operations in steps S151, and S172 through S175 are repeated until the process results are notified at the end of the copy process.

FIG. 15 is a sequence chart illustrating an example of an operation of each apparatus when the fourth notification method is used. The process of FIG. 15 is triggered when an access operation is performed on the information processing apparatus 10 (such as inputting a URL or selecting a bookmark) with the browser turned on in the display apparatus 4. The device controller 42 in the display apparatus 4 receives the access operation (step S191), and establishes a connection with the interface 50 in the information processing apparatus 10 in accordance with the WebSocket standard in cooperation with the communication unit 43 (step S192).

If a predetermined status (such as an out-of-toner or out-of-paper sheet status) occurs later on the information processing apparatus 10, the middleware layer 70 and the hardware layer 80 of the information processing apparatus 10 cooperate to detect the predetermined status (step S201). The middleware layer 70 and the hardware layer 80 supply the status information indicating the detected status to the event notification unit 62 (step S202). The event notification unit 62 generates the notification data describing the supplied status information described thereon (step S203), and transmits the notification data to the WebSocket-connected display apparatus 4 via the interface 50 (step S204). The device controller 42 in the display apparatus 4 displays the status information described on the notification data received in step S204 on the display unit of the display apparatus 4 (step S205).

As described above, statuses different from one display apparatus 4 to another display apparatus 4 may be notified. In such a case, subsequent to step S192, the device controller 42 transmits to the information processing apparatus 10 via the communication unit 43 the notification request data describing the status to be notified to the display apparatus 4. Upon receiving the notification request data via the interface 50, the event notification unit 62 stores the status to be notified in association with the destination of the display apparatus 4. If the status information supplied in step S202 represents the stored status to be notified, the event notification unit 62 notifies that status.

The procedure of how the notification unit 104 determines one of the first through third notifications for use in the notification is described below. In the exemplary embodiment, the notification unit 104 uses a different notification method depending on whether the display apparatus 4 has the function of receiving the push-based notification, namely, the notification via the communication other than the HTTP response.

If the display apparatus 4 has the function of performing communication complying with WebSocket, the notification unit 104 determines that the display apparatus 4 has the function of receiving the push-based notification. For example, the requesting unit 402 in the display apparatus 4 describes whether the process request data describes information as to whether an active browser supports the WebSocket standard. The information may be a character string "supporting" or "not supporting", or a flag "1" or "0" ("1" indicates that the browser supports WebSocket, and "0" indicates that the browser does not support WebSocket). The information may be the name of the browser or the version information of the browser. Note that whether WebSocket is supported or not is dependent on the version of each browser.

The notification unit 104 analyzes the process request data or browser type information received by the controller 105 via the interface unit 101. If the information indicates that WebSocket is supported, the notification unit 104 determines that the display apparatus 4 has the function of receiving the push-based notification. If the information indicates that WebSocket is not supported, the notification unit 104 determines that the display apparatus 4 does not have the function of receiving the push-based notification. Alternatively, the notification unit 104 may determine that the display apparatus 4 has the function of receiving the push-based notification if the connection complying with the WebSocket standard is actually established, or may determine that the display apparatus 4 does not have the function of receiving the push-based notification if the connection complying with the WebSocket standard is not established.

If the display apparatus 4 does not have the function of receiving the push-based notification, the notification unit 104 notifies the display apparatus 4 of the process results in the response responsive to the request from the display apparatus 4 (such as the process request or notification request) using one of the first and second notification methods. If the second notification method is selected, the contents of the notification may include information concerning a polling interval. If the display apparatus 4 has the function of receiving the push-based notification, the notification unit 104 may perform the notification using any of the first through third notification methods. In the exemplary embodiment, the third notification method may be used to notify the display apparatus 4 of the process results such that the process results are received through the function when the process is complete.

When the display apparatus 4 requests the process, the notification unit 104 uses a different notification method depending on time to complete the requested process (time elapse from the request of the process to the completion of the process, and hereinafter referred to as "process time"). More specifically, if the process time is equal to or above a threshold value (such as 0.5 second or 1 second), the notification unit 104 notifies the process results (and the status of the process) using the second notification method (the pull-based notification subsequent to the response to the process request) or the third notification method (the push-based notification subsequent to the response to the process request). If the process time is below the threshold value, the notification unit 104 notifies the process results using the first notification method (the notification through the response responsive to the process request).

The notification unit 104 calculates the process time as described below. The notification unit 104 stores a process time table that associates each process with the average process time.

FIG. 16 illustrates an example of the process time table. In this process time table, the "copy process" is associated with the average process time "2 seconds+page count×2 seconds". This is intended to mean that it takes 2 seconds to read an original document from the start of the copy process to the start of forming the image of a first page, and that it takes 2 seconds to form the image on each page of medium.

The "fax process of original data" is intended to mean a fax process to fax original document data if the original document data is available without reading the original document. This process is associated with the average process time, namely, the sum of the average time "3 seconds+page count×0.5 second) to establish a connection to a fax network (3 seconds in this example), and the time to transmit data of one page (0.5 second in this example).

The "reading process and fax process of original document data" additionally involve a reading process of the original document, and are thus associated with the average process time of "3 seconds+page count×1.0 seconds" additionally accounting for the time to read one page of the original document (0.5 second in this example). The "reading process of image from SD memory card" is associated with the average process time "image count×0.05 second", and the "modification process of parameter" is associated with the average process time "0.1 second". The notification unit 104 initially uses the average process time determined through testing. The process time may be measured when these processes are performed, and the average process time may be updated based on the measurements.

The notification unit 104 acquires the "page count" of the original document to be used in the "fax process of original document data" from the parameter described in the process request data. The notification unit 104 also acquires the "page count" to be used in the "copy process" or the "reading process and fax process of original document" from the image reading unit 13 when the image reading unit 13 of FIG. 4 completes the reading of the image subsequent to the start of the process. The notification unit 104 acquires the "image count" to be used in the "reading process of image from SD memory card" when the notification unit 104 accesses an SD card (or one of folders in the SD card) via the connection unit 17 of FIG. 4. The notification unit 104 calculates the process time based on the processes describe in the process request data, each of these acquired pieces of information, and the process time table, and then determines whether the process time is the threshold value or longer.

The procedure of the notification unit 104 to determine the notification method is summarized as below.

Figure 17:
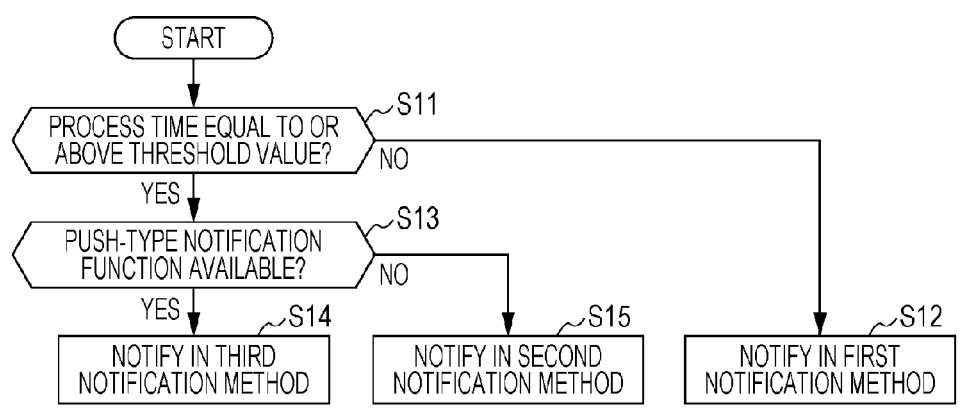
FIG. 17 is a flowchart illustrating an example of a determination process of the notification method.

FIG. 17 is a flowchart illustrating an example of a determination process of the notification method. In response to the process request from the display apparatus 4, the notification unit 104 determines whether the process time of the process is the threshold value or longer (step S11). If the process time is below the threshold value (no branch), the notification unit 104 performs the notification through the first notification method (the notification through the response responsive to the process request) (step S12). If the process time is equal to or above the threshold value (yes branch), the notification unit 104 determines whether the display apparatus 4 having requested the process has the function of receiving the push-based notification (step S13). Upon determining that the display apparatus 4 has the function (yes branch), the notification unit 104 performs the notification in the third notification method (the push-based notification subsequent to the response responsive to the process request) (step S14). Upon determining that the display apparatus 4 has no such function (no branch), the notification unit 104 performs the notification in the second notification method (the pull-based notification subsequent to the response responsive to the process request) (step S15).

If the first notification method is used, the requesting unit 402 accepts no operation during the period from the process request to the notification of the process results. On the other hand, if the second notification or the third notification is used, the response is made first even if the process is not complete in response to the request. In comparison with the first notification method, the period throughout which the requesting unit 402 accepts no operation tends to be short.

When the process results of the process requested by the HTTP request are notified in the exemplary embodiment, the first notification method is not used if the process time of the process is equal to or above the threshold value. For this reason, the period throughout which an apparatus as a requester of the process (the display apparatus 4) waits on standby for the HTTP response and thus accepts no operation is not too long.

If the copy process is performed with the first notification method used, the status of the process, such as the status information C2 of FIG. 7B, remains to be displayed until the process results are displayed. If the process results are notified, they are immediately displayed and conveyed to the user. In contrast, even if the process is completed in the second notification method, the process results are notified only when the display apparatus 4 makes the notification request. In the third notification method, the notification unit 104 notifies the process results when the process is complete. However, if the display apparatus 4 displays an image (for example, the operation image data A1 of FIG. 6) other than the status information in response to an operation of the user, the notified process results are not immediately conveyed to the user.

The use of the first notification method tends to result in a short period used to convey the process results to the user in comparison with the second or third notification method. If the process time of the requested process is below the threshold value in the exemplary embodiment, the first notification method is used. As described previously, the process results are conveyed to the user more quickly while the period throughout which the apparatus as the requester of the process (the display apparatus 4) waits on standby for the HTTP response and accepts no operation is set to be not too long.

The process results are notified more quickly when the third notification method is used with the push-based notification performed through the communication other than the HTTP response than when the second notification method is used with the pull-based notification performed through the HTTP response. If the third notification method is used on an apparatus having no reception function, the notification remains unreceived. Avoiding the use of the third notification method on the apparatus having no reception function in the exemplary embodiment minimizes a failure to receive the notification. In accordance with the exemplary embodiment, the process results are reliably notified in comparison with the case in which no consideration is given to whether the display apparatus 4 has the function of receiving the notification through the communication other than the HTTP response.

In the determination process of the determination method illustrated in FIG. 17, the notification unit 104 first determines whether the process time is equal to or above the threshold value, and performs the notification in the first notification method if the process time is below the threshold value (the notification through the response responsive to the process request). Alternatively, without performing this determination, the notification unit 104 may determine whether the display apparatus 4 having requested the process has the function of receiving the push-based notification. If the display apparatus 4 has the function, the notification unit 104 performs the notification in the third notification method (the push-based notification subsequent to the response responsive to the process request). If the display apparatus 4 has no such function, the notification unit 104 performs the notification in the second notification method (the pull-based notification subsequent to the response responsive to the process request). Alternatively, the notification unit 104 may determine whether the display apparatus 4 having requested the process has the function of receiving the push-based notification, and then may determine whether the time to complete the process is equal to or above the threshold value.

The exemplary embodiment has been described for exemplary purposes only, and may be modified as described below. The exemplary embodiment and the modifications thereof may be combined as appropriate.

In the discussion of the exemplary embodiment, the user apparatus 20 includes the communication unit that performs communications complying with the wireless LAN standards. The exemplary embodiment is not limited to this configuration. For example, the user apparatus 20 may include a communication unit complying with the wired LAN standards, such as the communication unit 33 in the operation device 30. In such a case, the user apparatus 20 is connected to a wired LAN router or hub via a communication cable. The communication unit in the user apparatus 20 works to communicate with the other communication device (such as a router or hub). The communication unit may perform the communication complying with standards of Bluetooth (registered trademark) or near field communication (NFC).

In the discussion of the exemplary embodiment, the first communication unit 15 in the information processing apparatus 10 and the communication unit 33 in the operation device 30 perform communications complying with the wired LAN standards. The exemplary embodiment is not limited to this configuration. For example, communications complying with universal serial bus (USB) or high-definition multimedia interface (HDMI) (registered trademark) may be performed. Furthermore, wireless communications complying with the wireless LAN standards, Bluetooth (registered trademark), or near field communication (NFC) may be performed. In each case, the communication unit 33 in the operation device 30 communicates with the first communication unit 15 in the information processing apparatus 10 without routing via another communication device, such as a router or hub. The communication unit 33 in the operation device 30 thus communicates with the information processing apparatus 10 without any other communication device interconnected therebetween.

In the exemplary embodiment, the operation device 30 includes the controller 31, the memory 32, and the communication unit 33 as illustrated in FIG. 2. However, the operation device 30 may not necessarily have to include the controller 31, the memory 32, and the communication unit 33.

Figure 18:
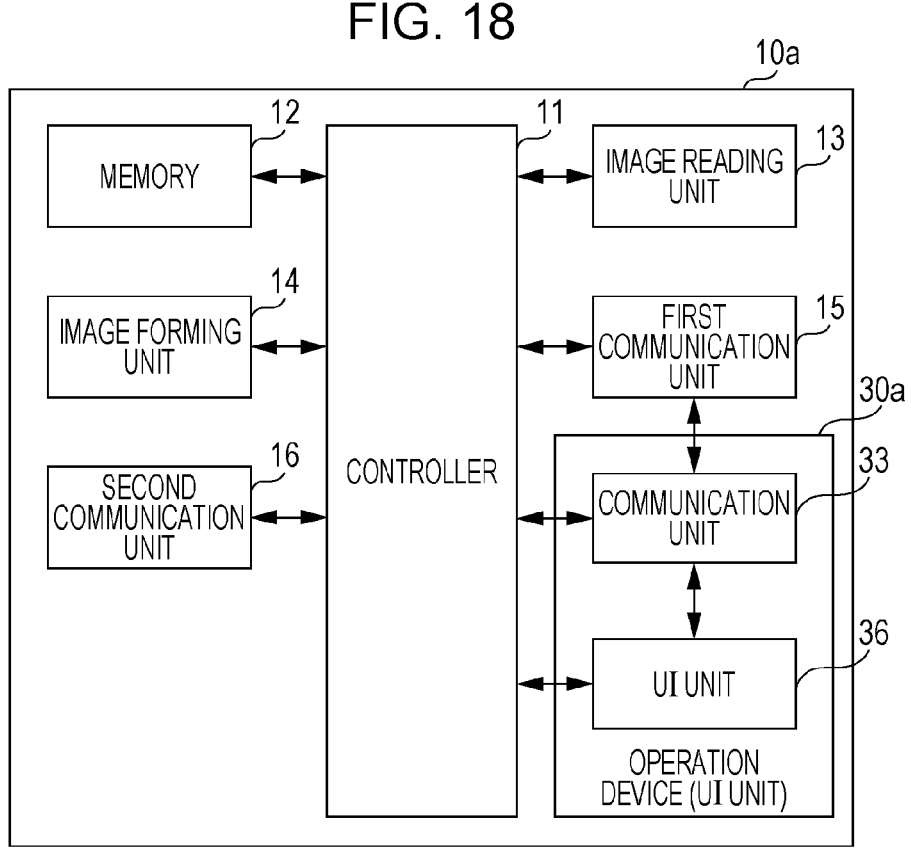
FIG. 18 illustrates an example of the hardware configuration of an information processing apparatus of a modification.

FIG. 18 illustrates an example of the hardware configuration of an information processing apparatus 10a of a modification of the exemplary embodiment. FIG. 18 illustrates the information processing apparatus 10a, including elements similar to those illustrated in FIG. 4 other than the display unit, and an operation device 30a. In this modification, the operation device 30a is mounted on the housing of the information processing apparatus 10a. The operation device 30a includes the communication unit 33 of FIG. 3 and a user interface (UI) unit 36.

The communication unit 33 and the UI unit 36 are connected to a bus in the information processing apparatus 10a, and are controlled by the controller 11. The communication unit 33 is also connected to the first communication unit 15. The UI unit 36 includes a display screen and a touch sensor overlaid on the display screen, receives an operation from the user, and displays an image in response to the operation of the user. The UI unit 36 supplies to the controller 11 operation data responsive to the received user operation, and the controller 11 performs a process responsive to the operation data.

In this modification, the controller 11 executes the program of a browser, thereby implementing the function of the operation unit 300 of FIG. 5. The display 301 receives the operation image data via the first communication unit 15 and the communication unit 33, and displays the operation image data on the UI unit 36. The requesting unit 302 receives an operation on the operation image data when the UI unit 36 is tapped by the user. Via the communication unit 33 and the first communication unit 15, the requesting unit 302 transmits instruction data indicating an instruction determined by the received operation. In this modification, the communication is performed between the information processing apparatus 10*a* and the display apparatus 4 via the interface unit regardless of whether the communication is performed via the other communication device or not.

In the exemplary embodiment and the modifications, the operation device 30 is mounted to the housing of the information processing apparatus. But the operation device 30 may not necessarily have to be mounted to the housing of the information processing apparatus.

Figure 19:
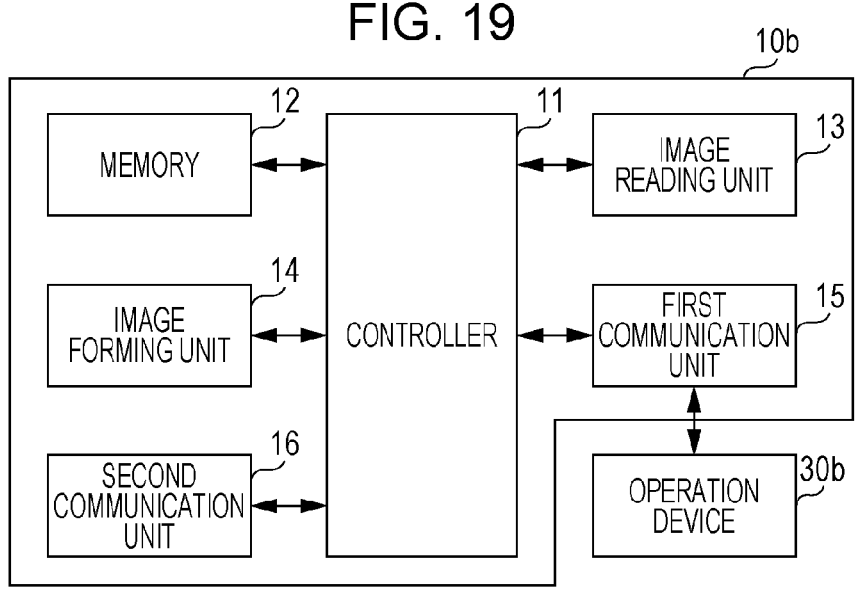
FIG. 19 illustrates an example of the hardware configuration of the information processing apparatus of the modification.

FIG. 19 illustrates an example of the hardware configuration of an information processing apparatus 10*b* of a modification. FIG. 19 illustrates the information processing apparatus 10*b*, including elements similar to those illustrated in FIG. 4 other than the display unit, and an operation device 30*b*. The operation device 30*b* includes the elements illustrated in FIG. 3, and works as the operation unit 200 of FIG. 5.

The operation device 30*b* is connected to the first communication unit 15 via a communication cable or a data bus cable. The operation device 30*b* is used by the user in a state in which the operation device 30*b* is mounted on the housing of the information processing apparatus 10*b* or placed on a desk near the information processing apparatus 10*b*. As the operation device 30 of the exemplary embodiment, the operation device 30*b* communicates with the information processing apparatus 10*b* without routing via the other communication device (such as the communication device 3 in FIG. 1). The communication cable or the data bus cable may be unplugged from the operation device 30*b* and the operation device 30*b* may be carried to another location to be used for different applications. In the example of FIG. 19, another apparatus working as an operation unit (such as the user apparatus 20 of FIG. 1) instead of the operation device 30*b* may be connected to the information processing apparatus 10*b*. The operation device 30*b* may be connected to the communication device 3 to communicate with the information processing apparatus 10*b* via the communication device 3 and the communication network 2.

The processes to be performed by the processing unit 103 are not limited to those described with reference to the exemplary embodiment, and may include any process. For example, if the information processing apparatus includes a machine in a plant and a device that controls the machine, the machine may transport or process materials. In this case, one of the user apparatus 20 and the operation device 30 makes communications with the information processing apparatus 10 via a common interface unit, thereby operating the information processing apparatus.

In the exemplary embodiment, the requesting unit 402 receives an operation on the touch sensor. The configuration is not limited to the touch sensor. If the user apparatus is a tablet terminal, the operation may be received using a button disposed on the housing of the user apparatus. If the user apparatus is a personal computer, the operation may be received using a keyboard or mouse.

The interface unit 101 complies with the SOAP standard. Alternatively, the interface unit 101 may interface for communications complying with standards for representational state transfer (REST) or standard generalized markup language (SGML). The interface unit 101 may be any type as long as the interface unit 101 interfaces for communications complying with any standard for use in web. In this way, most of apparatuses enabled to use a browser may be used as an operation device.

The notification unit 104 may calculate the process time in a method different from the method of the exemplary embodiment. For example, the notification unit 104 corrects the process time calculated in accordance with the exemplary embodiment based on the state of the CPU of the information processing apparatus 10 (such the use rate of the CPU or the number of available cores), and the state of the RAM (such as the use rate of the RAM). For example, the notification unit 104 may multiple the process time by 0.8 if the use rate of the CPU is 20 percent or less, and may multiply the process time by 1.2 if the use rate of the CPU is 80 percent or more.

It may be difficult to measure the process time through testing on the information processing apparatus 10. The process time may be calculated using the process time table created in accordance with the measurement results of an information processing apparatus having average throughput. That process time may be multiplied by a coefficient responsive to the performance of the CPU of the information processing apparatus 10 (such as the number of cores and frequency), and the capacity of the RAM to result in the final process time. In such a case, if the requested process is user authentication that is based on process results derived from an external apparatus, a predetermined duration of time may be further added.

In the exemplary embodiment, the notification unit 104 uses the notification method determined as described above to notify the process results. If the notification method is specified by the display apparatus 4, the notification unit 104 may use the specified notification method. For example, the requesting unit 402 in the display apparatus 4 may describe the specified notification method on the process request data, and the notification unit 104 may use the specified notification method in accordance with the description.

Figure 20:
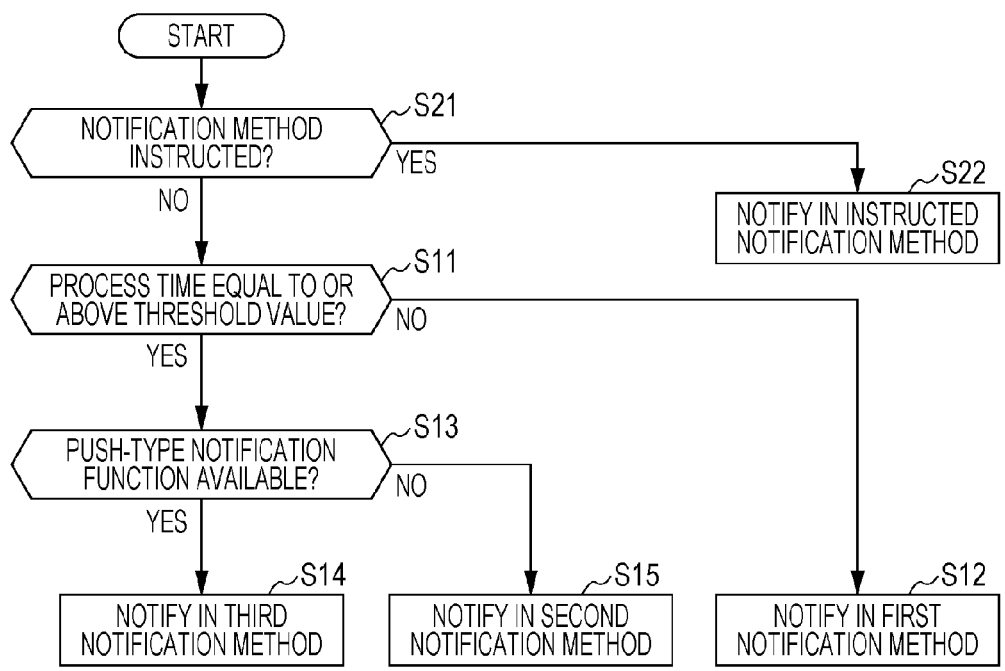
FIG. 20 is a flowchart illustrating a process example of the notification method of the modification.

FIG. 20 is a flowchart illustrating a process example of the notification method of the modification. When the display apparatus 4 requests the process, the notification unit 104 determines whether the process request specifies a notification method (step S21). If a notification method is specified (yes branch), the notification unit 104 performs the notification in the specified notification method (step S22). If no notification method is specified (no branch), the notification unit 104 proceeds to step S11 of FIG. 17, and performs the same operations as those of the exemplary embodiment. If the notification method is designed to be specified by an operation of the user, the process results are notified in the notification method desired by the user.

If the third notification method that is a push-based notification is specified, the notification unit 104 determines, as previously described with reference to step S13, whether the display apparatus 4 has the function of the push-based notification. If the display apparatus 4 has the function of the push-based notification, the notification unit 104 uses the specified notification method. If the display apparatus 4 has no such function, the notification unit 104 uses the first notification method or the second notification method (for example, uses the first notification method if the process time is below the threshold value and uses the second notification method if the process time is equal to or above the threshold value). If the first notification method is specified, the notification unit 104 determines, as previously described with reference to step S11, whether the process time is equal to or above the threshold value. If the process time is below the threshold value, the notification unit 104 uses the specified notification method. If the process time is equal to or above the threshold value, the notification unit 104 may use the second notification method or the third notification method. Alternatively, the notification unit 104 may determine the notification method in view of the condition as to whether the load of the process of the information processing apparatus 10 (such as the use rate of the CPU) is equal to or above a threshold value or as to whether the display apparatus 4 is an operation apparatus or a user apparatus (whether the communication is performed via the communication device 3).

The results of the requested process may now be notified. The notification may be performed only by the HTTP response responsive to the HTTP request from the display apparatus 4 that is configured to display the results. In such a case, there may be a long period of time throughout which the display apparatus 4 is unable to receive the notification because of control of the notification process of the information processing apparatus 10. In the exemplary embodiment, the notification method may be specified, or the information processing apparatus 10 configured to notify the results of the requested process may perform the determination based on the conditions other than the process time. In each case, not only the pull-based notification through the HTTP response but also the push-based notification are designed to be performed. In comparison with the notification that is performed only by the HTTP response, the period throughout which the display apparatus 4 is unable to receive the notification is designed to be not too long.

In a particular case, the notification unit 104 may use a notification method different from those described with reference to the exemplary embodiment if the process time is equal to or above or below the threshold value. For example, if a predetermined process is requested, the notification unit 104 notifies the process results in the first notification method even if the process time is equal to or above the threshold value. More specifically, if a process to cancel the copy process or the print process is requested, the notification unit 104 performs the notification in the first notification method.

If the first notification method is used, the period throughout which the requesting unit 402 in the display apparatus 4 is unable to receive an operation tends to be longer. But the display apparatus 4 is free from the difficulty that the results of the process are not displayed because the image other than the status information remains displayed when the second notification method or the third notification method is used. The first notification method thus reliably conveys the process results to the user. In the cancel process described above, if the process results indicating whether the cancel process has been actually performed are not conveyed to the user, the user may request the same process again even thought the cancel process has been actually performed. It is desirable to convey the process results to the user in a reliable fashion. In the modification, the first notification method is designed to be exceptionally used regardless of the process time. The process results are thus reliably conveyed to the user in comparison with the case in which the notification method is determined depending on the process time.

In the exemplary embodiment, the first notification method is used if the process time is below the threshold value. The notification unit 104 is not limited to this configuration. For example, the notification unit 104 may wait on standby until the requested process has been completed. The notification unit 104 performs the notification that the process has been received through the HTTP response, and then notifies the process results in WebSocket communication. In such a case, after a time elapse of the insensitive period to the operation of the user subsequent to the process request, the display apparatus 4 displays the process results together with an indication that the process has been accepted, and then becomes ready to receive an operation from the user. This arrangement makes it less likely that the process results notified are not immediately conveyed to the user because of some other image displayed. The process results are conveyed to the user more quickly than when the second notification method or the third notification method is used.

The information processing apparatus, the display apparatus, the communication device, and the information processing system including these apparatus may fall into the scope of the present invention. The information processing method to perform the process implemented by each of these apparatuses may fall into the scope of the present invention. A program causing a computer, such as the information processing apparatus or the display apparatus, to function as the elements described above may also fall within the scope of the present invention. The program may be provided in a stored state on a recording medium, such as an optical disk, or downloaded onto the computer via a communication network, such as the Internet, and then installed for use in the computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to execute:
   a controller configured to cause a processing unit to perform a process, the process being requested by a hypertext transfer protocol (HTTP) request from a display apparatus, the display apparatus being configured to display status of the process; and
   a first notification unit configured to transmit a first response notifying the display apparatus of a status after completion of the process, in response to determining that a time to complete the requested process is calculated to be below a threshold value before the process has been completed, the first response being an HTTP response, responsive to the HTTP request having requested the process,
   a second notification unit configured to transmit a second response notifying the display apparatus of the reception of the process request without waiting for the completion of the requested process, in response to determining that the time to complete the requested process is calculated to be equal to or above the threshold value before the process has been completed, the second response being an HTTP response responsive to the HTTP request having requested the process, wherein the second notification unit is further configured to transmit a third response notifying the display apparatus of the status in response to completion of the requested process, the third response being, a form of communication different from that of the first response and the second response.

2. The information processing apparatus according to claim 1, wherein, in response to a predetermined process being requested, and in response to the amount of time being equal to or above the threshold value, the notification unit is configured to transmit the first response.

3. The information processing apparatus according to claim 2,
wherein the HTTP request comprises information regarding whether the display apparatus is capable of receiving the second response, and
wherein the notification unit is configured to, in response to the information indicating that the display apparatus is capable of receiving the second response, transmit the second response upon completion of the process.

4. The information processing apparatus according to claim 3, wherein the notification unit is configured to, in response to the information indicating that the display apparatus is not capable of receiving the second response, transmit a third response notifying the display apparatus that the HTTP request has been accepted, the third response using a form of communication different from that of both the first response and the second response.

5. The information processing apparatus according to claim 1,
wherein the HTTP request comprises information regarding whether the display apparatus is capable of receiving the second response, and
wherein the notification unit is configured to, in response to the information indicating that the display apparatus is capable of receiving the second response, transmit a completion response upon completion of the process.

6. The information processing apparatus according to claim 5, wherein the notification unit is configured to, in response to the information indicating that the display apparatus is not capable of receiving the second response, transmit a third response notifying the display apparatus that the HTTP request has been accepted, the third response using a form of communication different from that of both the first response and the second response.

7. The information processing apparatus according to claim 5, wherein the notification unit is configured to, in response to the information indicating that the display apparatus is incapable of receiving the second response and in response to completion of the process, transmit the completion response upon receipt of a status request from the display apparatus.

8. An information processing system comprising:
the information processing apparatus according to claim 1;
a second processor configured to execute a requesting unit, the requesting unit being configured to transmit a request responsive to an operation of a user, the request comprising an HTTP request; and
a display unit configured to display the status,
wherein the requesting unit is configured to, in response to the request being transmitted, refrain from receiving a second operation of the user until an HTTP response is received.

9. The information processing apparatus according to claim 1, wherein the notification unit is configured to calculate an amount of time required to complete the process based on a type of the process and on an average time to complete a process of a same type as the type of the process, the average time to complete the process of the same type being stored in advance.

10. An information processing method comprising:
performing a process requested by a hypertext transfer protocol (HTTP) request from a display apparatus, the display apparatus being configured to display a status of the process;
calculating an amount of time that is expected to be required to complete the process;
transmitting, in response to calculating that the amount of time that is expected to be required is less than a predetermined threshold before the process has been completed, a first response notifying the display apparatus of the status, the first response being an HTTP response; and
transmitting, in response to calculating that the amount of time that is expected to be required is greater than or equal to the predetermined threshold before the process has been completed, a second response notifying the display apparatus that the HTTP request has been accepted before the process has been completed, the second response using a form of communication different from that of the first response.

11. The information processing method according to claim 10, further comprising:
transmitting, in response to the amount of time being greater than or equal to a predetermined threshold, and in response to the display apparatus being incapable of receiving the second response, a third response notifying the display apparatus that the HTTP request has been accepted, the third response using a form of communication different from that of both the first response and the second response.

12. A non-transitory computer readable medium storing a program causing a computer to execute a process for processing information, the process comprising:
performing a process requested by a hypertext transfer protocol (HTTP) request from a display apparatus, the display apparatus being configured to display a status of the process;
calculating an amount of time that is expected to be required to complete the process;
transmitting, in response to calculating that the amount of time that is expected to be required is less than a predetermined threshold before the process has been completed, a first response notifying the display apparatus of the status, the first response being an HTTP response; and
transmitting, in response to calculating that the amount of time that is expected to be required is greater than or equal to the predetermined threshold before the process has been completed, a second response notifying the display apparatus that the HTTP request has been accepted before the process has been completed, the second response using a form of communication different from that of the first response.

13. The non-transitory computer readable medium according to claim 12, the process further comprising:
   transmitting, in response to the amount of time being greater than or equal to a predetermined threshold, and in response to the display apparatus being incapable of receiving the second response, a third response notifying the display apparatus that the HTTP request has been accepted, the third response using a form of communication different from that of both the first response and the second response.

* * * * *